US009319867B2

(12) United States Patent
Rivas Molina et al.

(10) Patent No.: US 9,319,867 B2
(45) Date of Patent: Apr. 19, 2016

(54) METHOD AND APPARATUSES FOR POLICY AND CHARGING CONTROL OF MACHINE-TO-MACHINE TYPE COMMUNICATIONS

(71) Applicant: Telefonaktiebolaget L M Ericsson (publ), Stockholm (SE)

(72) Inventors: Ignacio Rivas Molina, Madrid (ES); Lars Lövsén, Göteborg (SE); Maria Belen Pancorbo Marcos, Madrid (ES); Louis Segura, Saint-Laurent (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/432,591

(22) PCT Filed: Dec. 10, 2012

(86) PCT No.: PCT/EP2012/074954
§ 371 (c)(1),
(2) Date: Mar. 31, 2015

(87) PCT Pub. No.: WO2014/053197
PCT Pub. Date: Apr. 10, 2014

(65) Prior Publication Data
US 2015/0245196 A1    Aug. 27, 2015

Related U.S. Application Data

(60) Provisional application No. 61/708,678, filed on Oct. 2, 2012, provisional application No. 61/708,759, filed on Oct. 26, 2012.

(51) Int. Cl.
*H04Q 11/00* (2006.01)
*H04W 8/18* (2009.01)
(Continued)

(52) U.S. Cl.
CPC ........... *H04W 8/186* (2013.01); *H04L 12/1407* (2013.01); *H04M 15/66* (2013.01); *H04W 4/005* (2013.01)

(58) Field of Classification Search
CPC .. H04W 8/186; H04W 4/005; H04L 12/1407; H04M 15/66
See application file for complete search history.

(56) References Cited

U.S. PATENT DOCUMENTS 9,055,557 B1 * 6/2015 Bayar et al.
2010/0017846 A1 * 1/2010 Huang et al. ...................... 726/1
(Continued)

FOREIGN PATENT DOCUMENTS

EP          2 453 609        5/2012
WO      WO 2010/086013     8/2010
(Continued)

OTHER PUBLICATIONS
PCT Notification of Transmittal of the International Search Report and the Written Opinion of the International Searching Authority, or the Declaration for International application No. PCT/EP2012/074954.
(Continued)

*Primary Examiner* — Clemence Han
(74) *Attorney, Agent, or Firm* — Baker Botts, LLP

(57) ABSTRACT

At present, applying conventional policy and charging control in scenarios where a huge amount of users is supported, such as machine-to-machine type communication devices, represents a number of drawbacks, such as the amount of data to be stored in subscriber databases and the access rate, the signalling load, and the processing performance of nodes. The present invention provides for a method of policy control and enhanced apparatuses enabling the support of user community profiles that apply to a plurality of subscribers, the generation and enforcement of community policy and charging rules derived from the user community profiles and preferably installed upon establishment of a session for a first user. Further sessions to be established for subsequent users of the plurality of users would be enforced with said community policy and charging rules without needs for handling them on individual basis.

23 Claims, 13 Drawing Sheets

(51) Int. Cl.
*H04L 12/14* (2006.01)
*H04M 15/00* (2006.01)
*H04W 4/00* (2009.01)

(56) References Cited

U.S. PATENT DOCUMENTS

| | | | |
|---|---|---|---|
| 2011/0158090 A1* | 6/2011 | Riley et al. ................. | 370/230 |
| 2011/0167471 A1* | 7/2011 | Riley et al. ................. | 726/1 |
| 2012/0023246 A1* | 1/2012 | Castro Castro et al. ...... | 709/229 |
| 2012/0084425 A1* | 4/2012 | Riley et al. ................. | 709/223 |
| 2012/0106391 A1* | 5/2012 | van Loon et al. ............ | 370/252 |
| 2012/0113855 A1* | 5/2012 | Wu et al. .................... | 370/252 |
| 2012/0142311 A1* | 6/2012 | Rui et al. .................... | 455/406 |
| 2013/0044646 A1* | 2/2013 | Qu et al. .................... | 370/259 |

FOREIGN PATENT DOCUMENTS

| | | |
|---|---|---|
| WO | WO 2011/006768 | 1/2011 |
| WO | WO 2011/134317 | 11/2011 |
| WO | WO 2011134317 A1 * | 11/2011 |

OTHER PUBLICATIONS

3GPP TS 29.212 V10.8.0 (Sep. 2012) 3rd Generation Partnership Project; Technical Specification Group Core Network and Terminals; Policy and Charging Control (PCC) over Gx reference point (Release 10).

3GPP TS 23.203 V10.8.0 (Sep. 2012) 3rd Generation Partnership Project; Technical Specification Group Services and System Aspects; Policy and charging control architecture (Release 10).

* cited by examiner

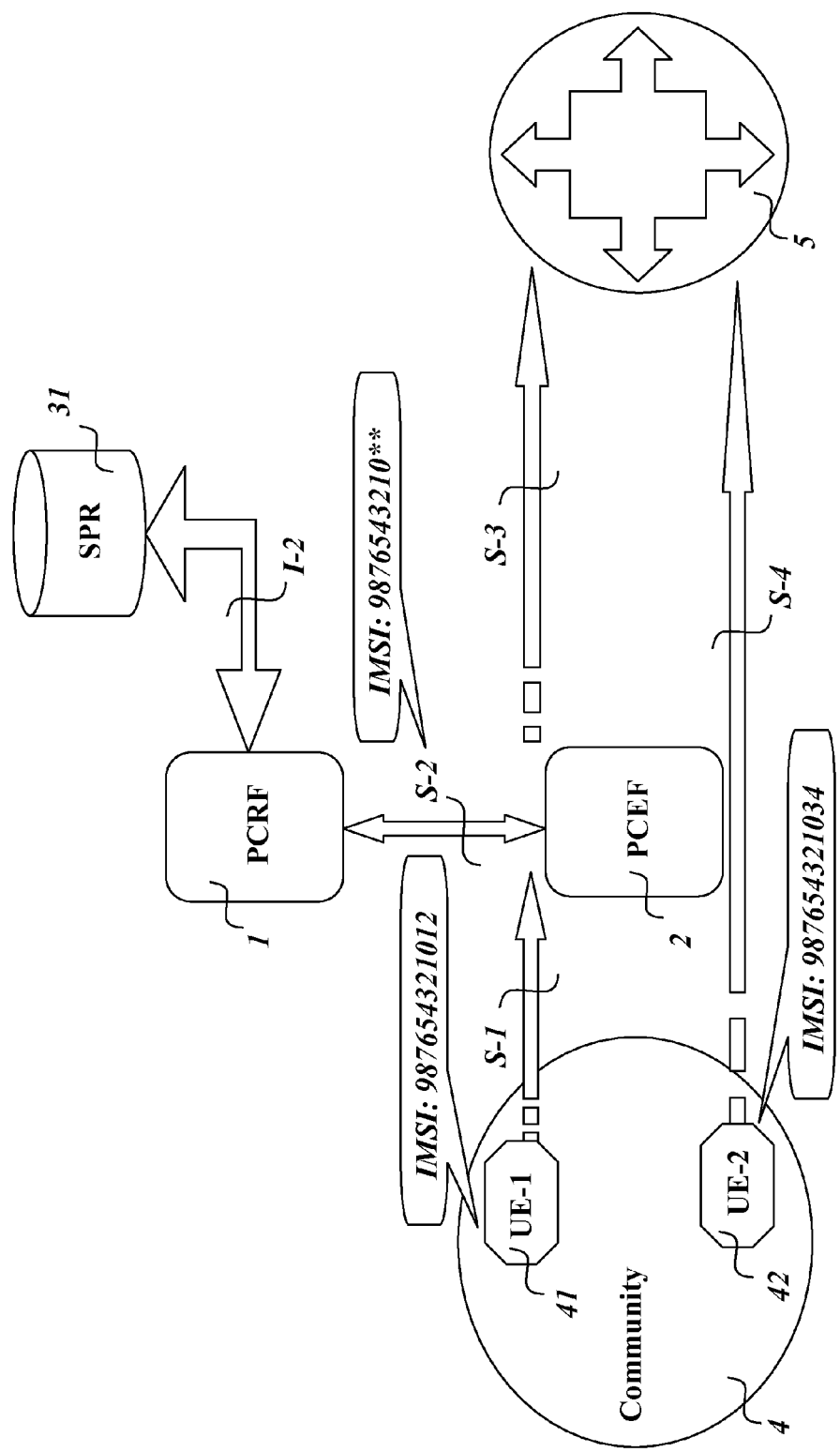
FIG. -1-

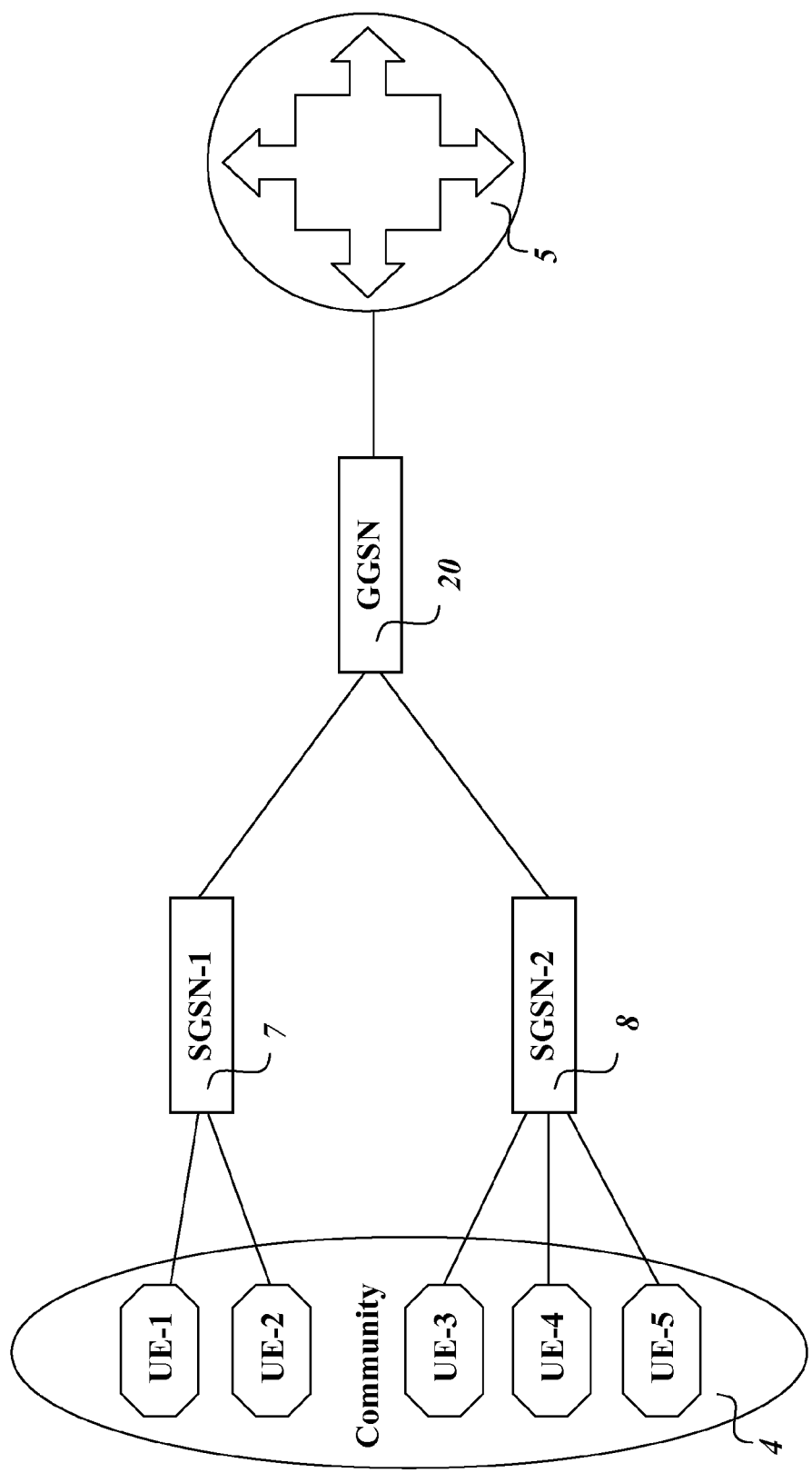
FIG. -2-

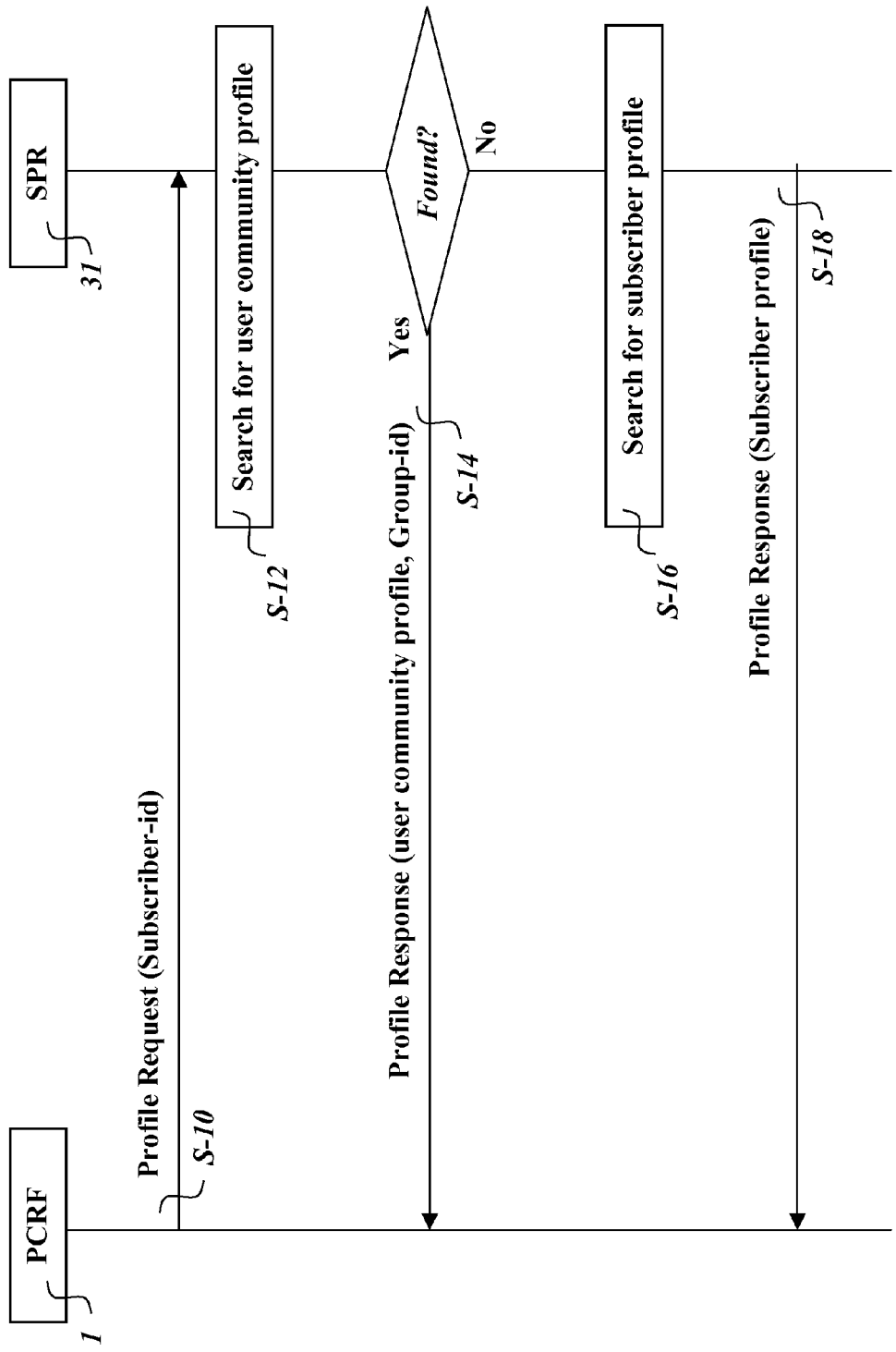
FIG. -3-

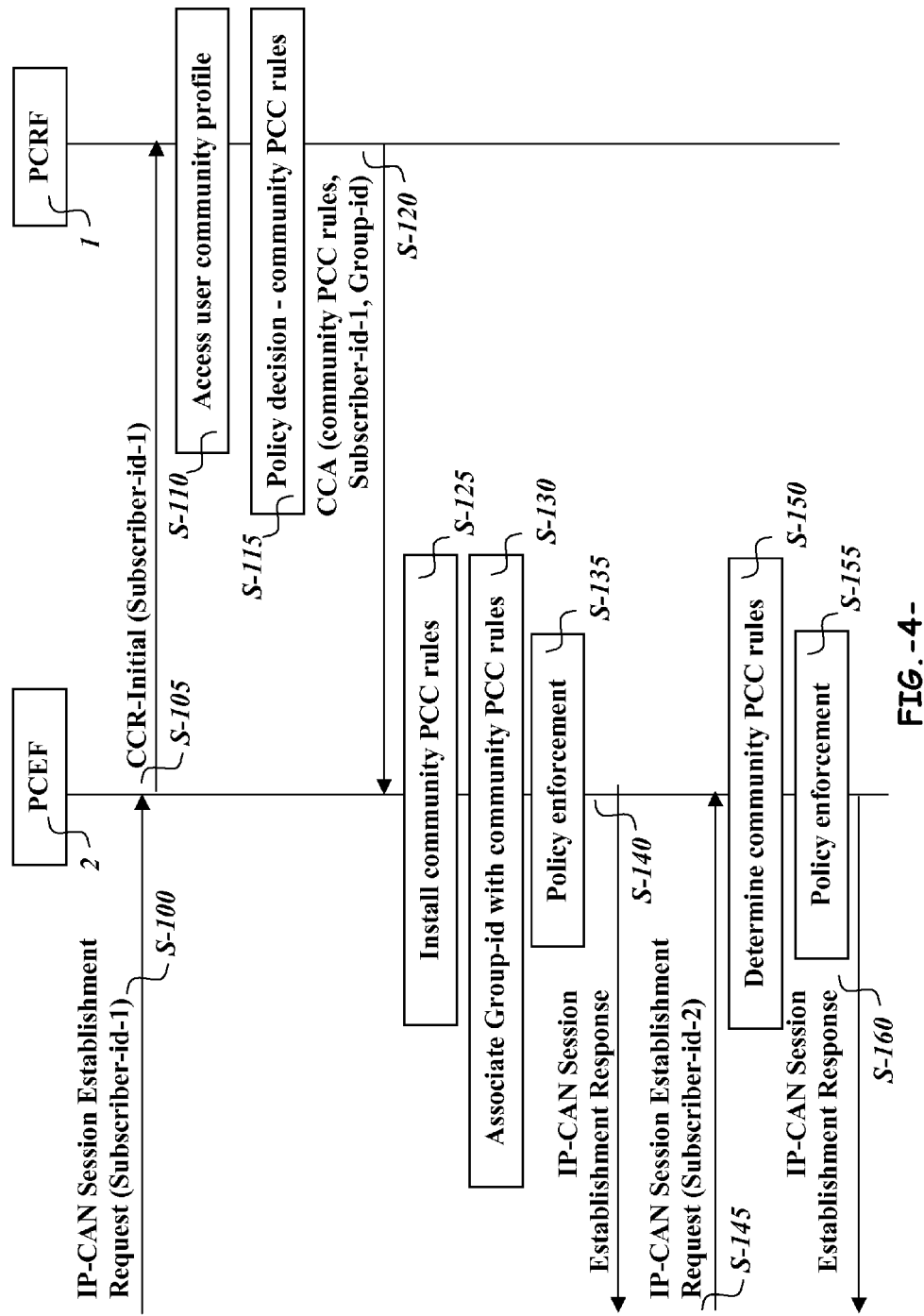
FIG. -4-

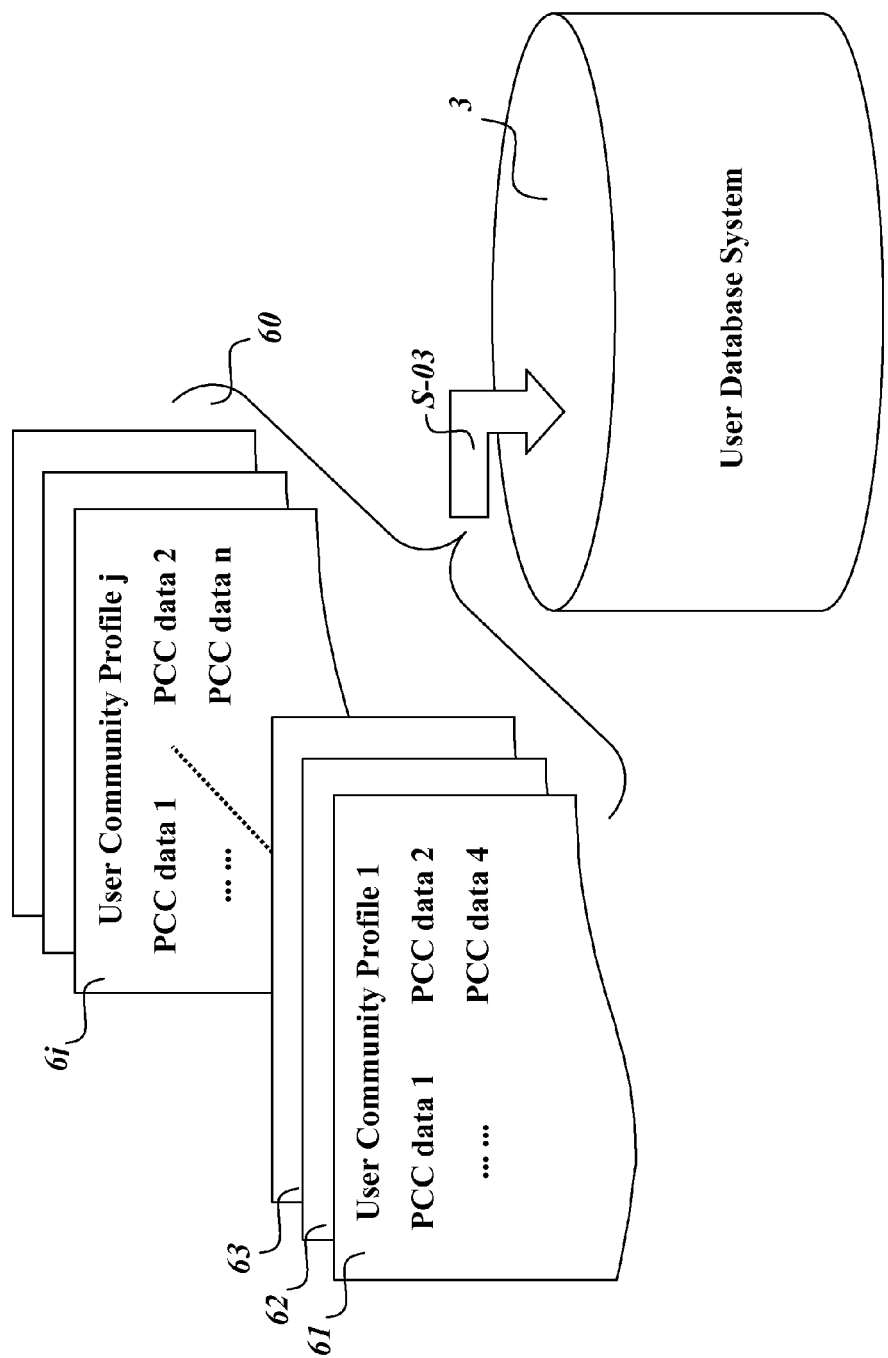
FIG. -5-

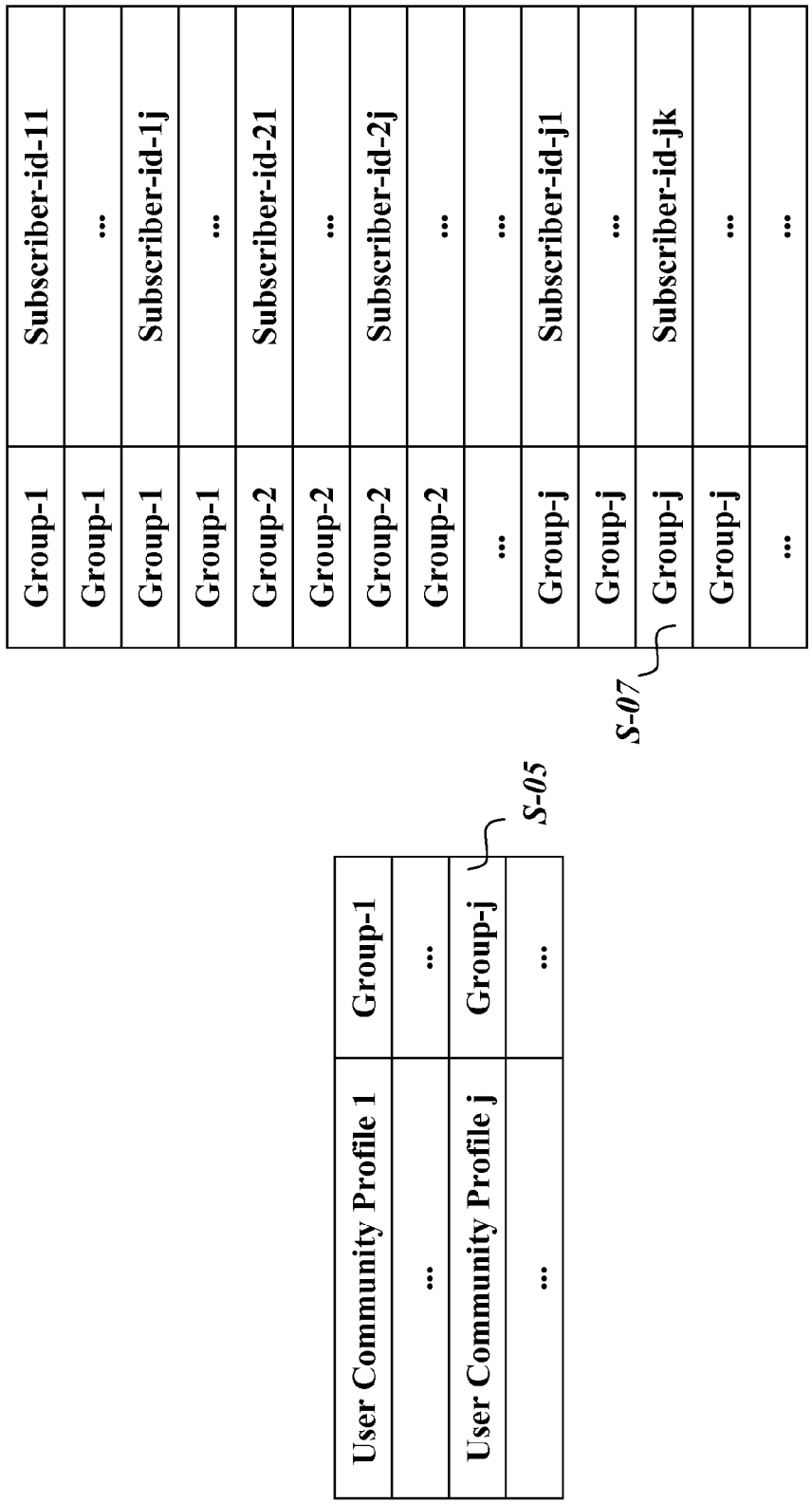
FIG. -6-

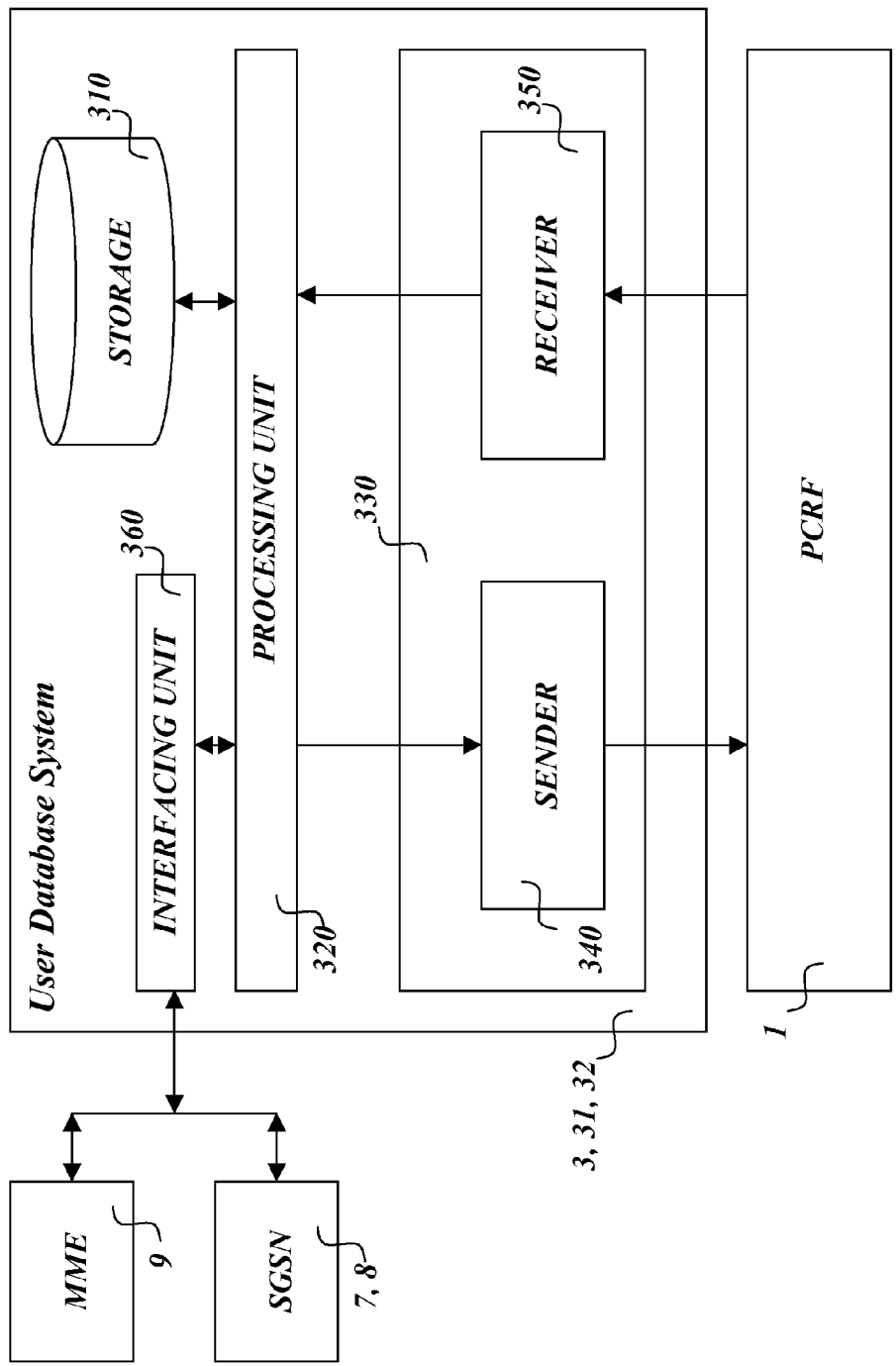
FIG. -7-

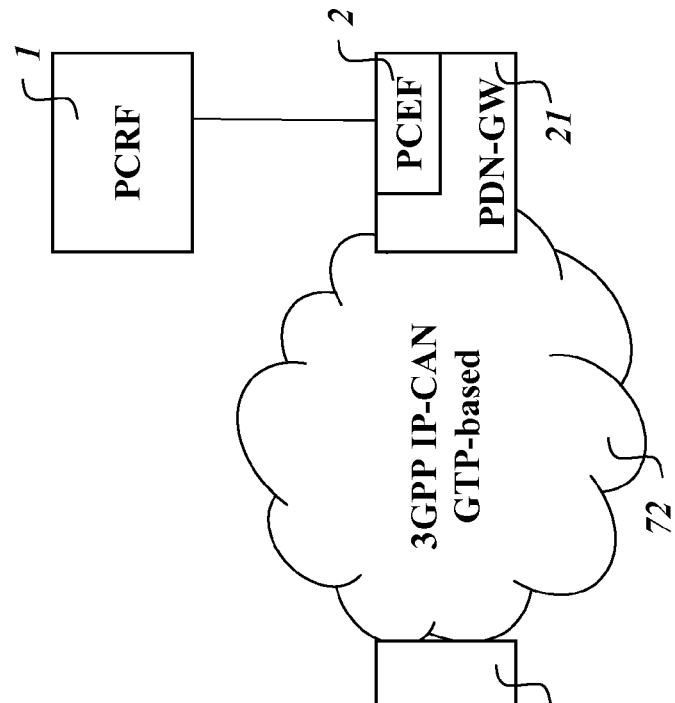
FIG.-8b-
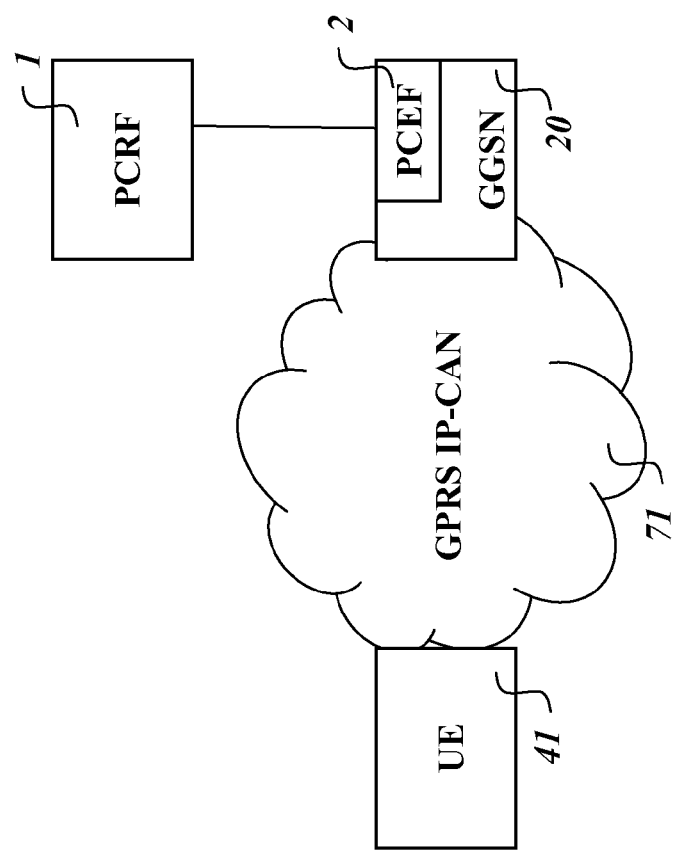
FIG.-8a-

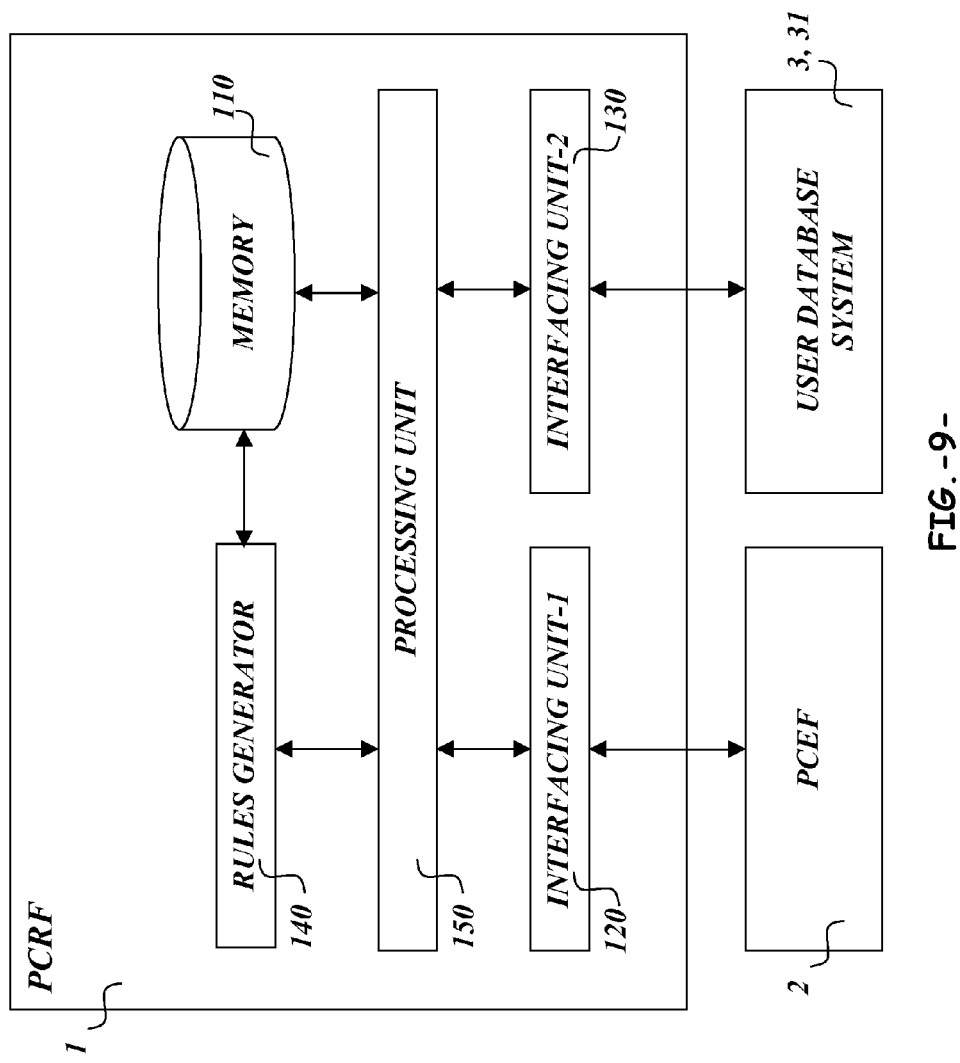
FIG. -9-

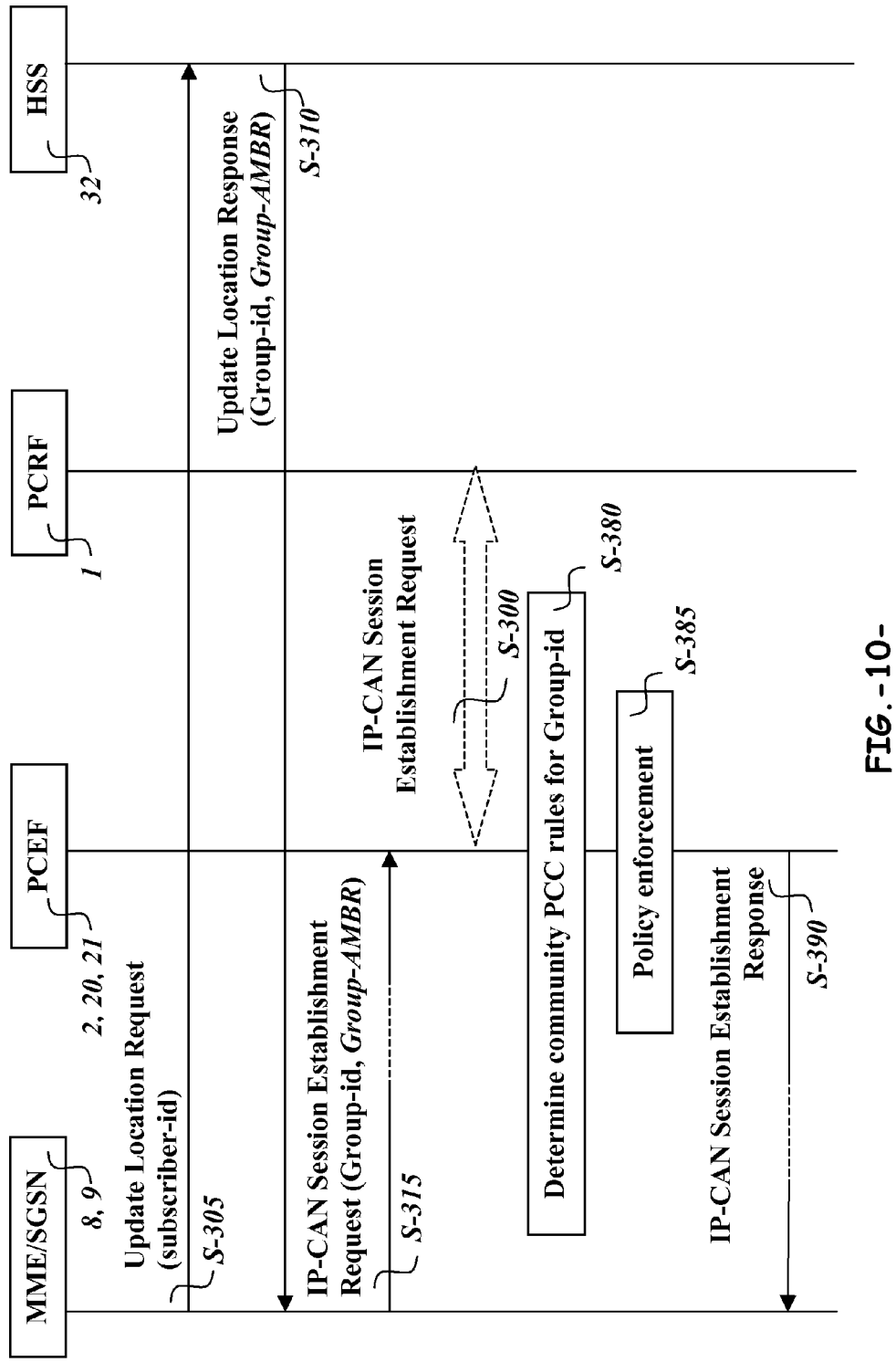
FIG.-10-

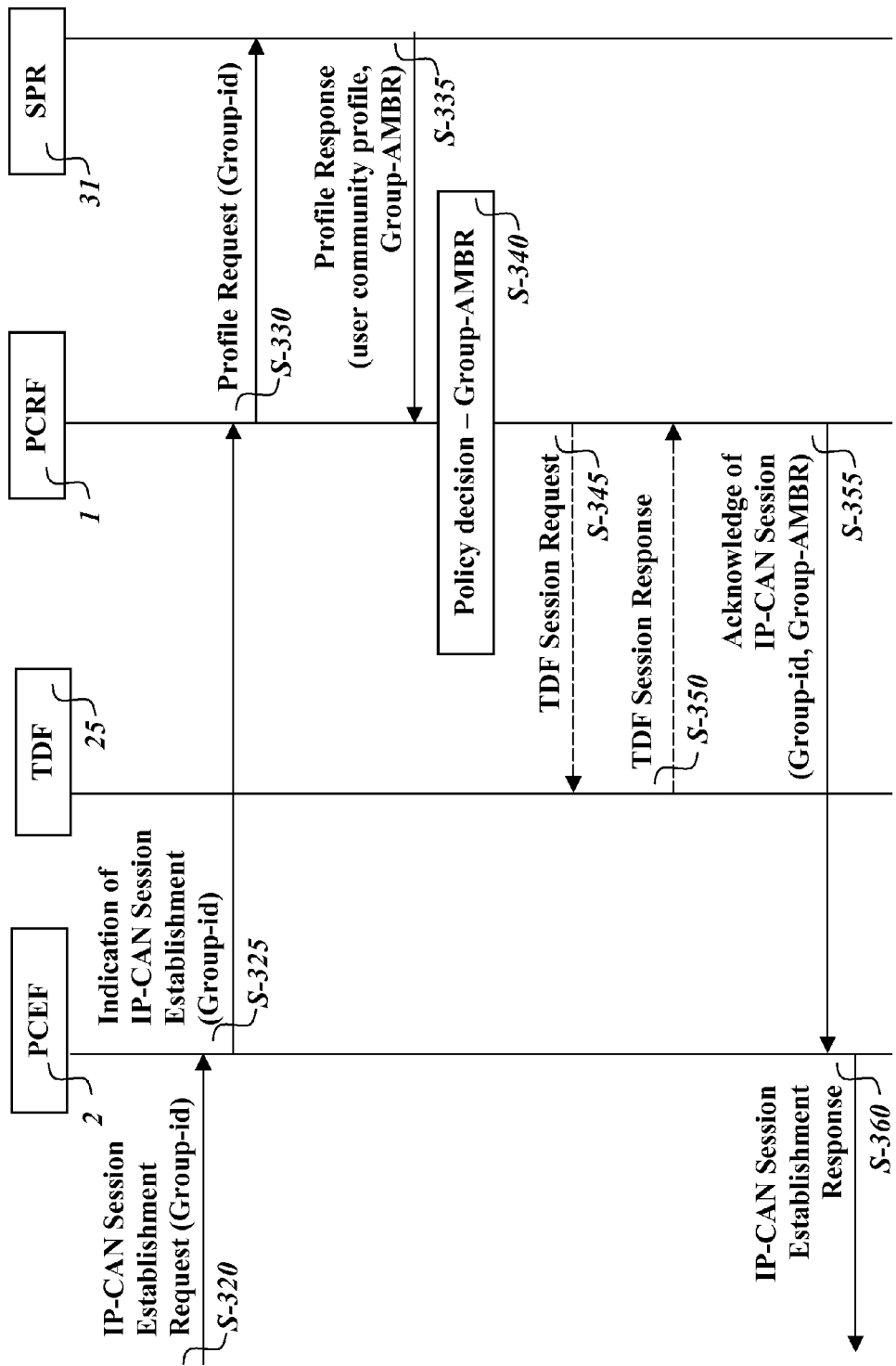
FIG. -11-

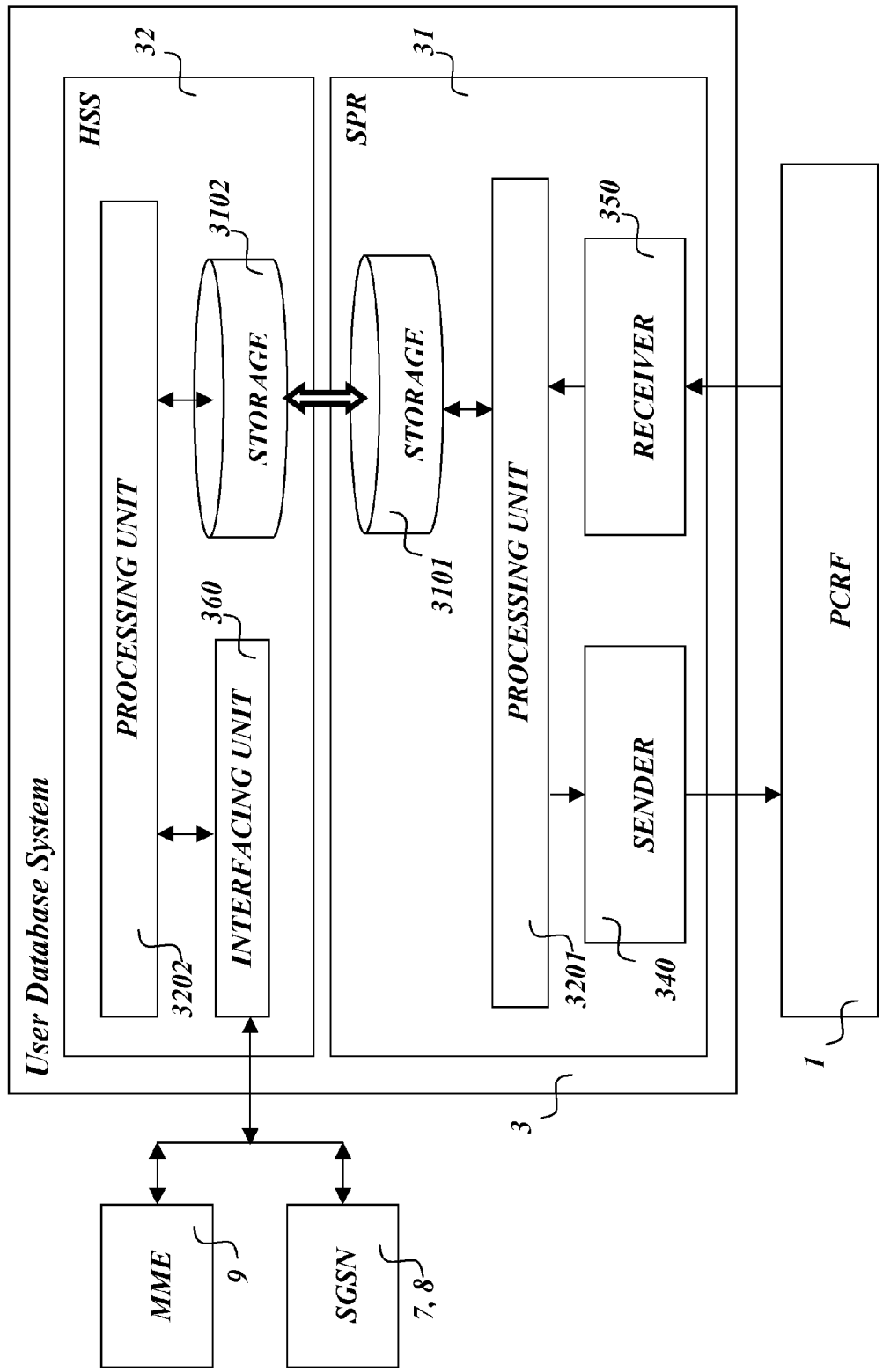
FIG.-12-

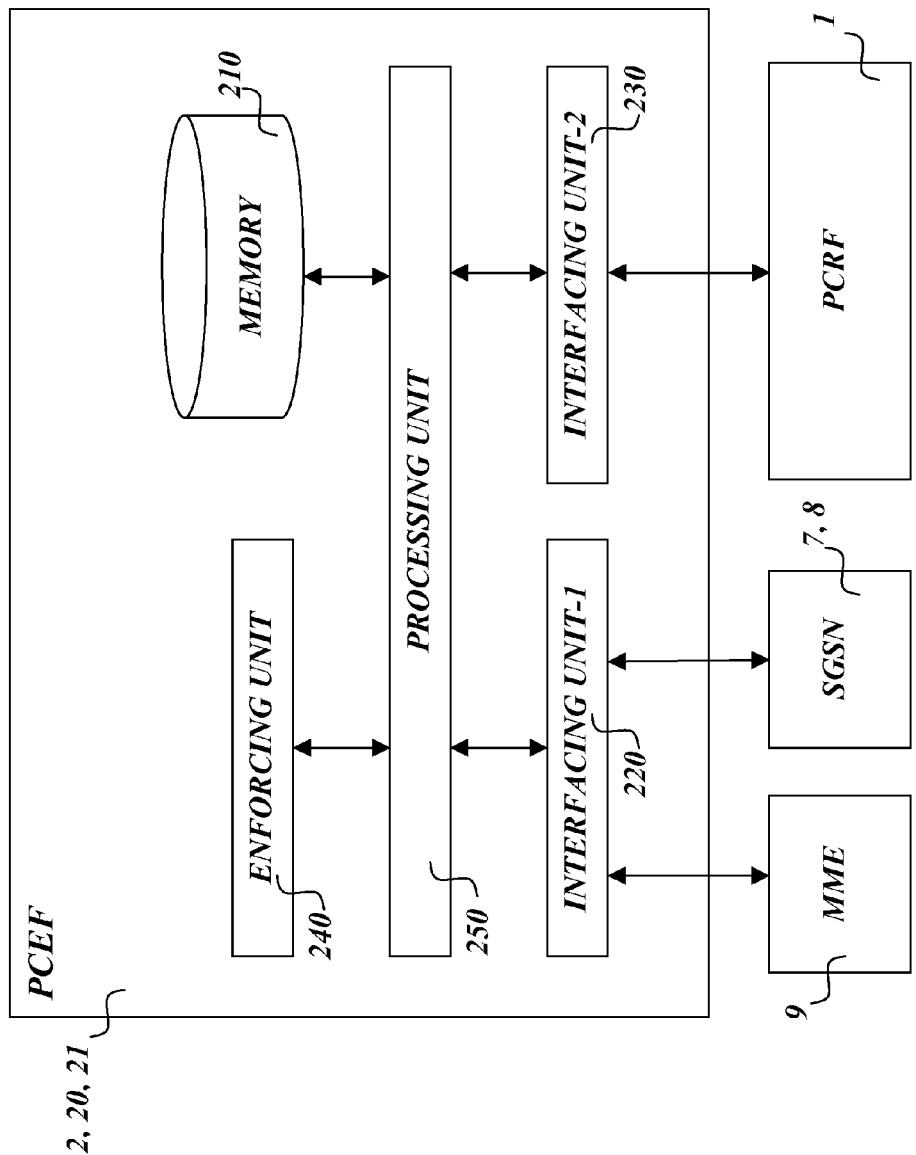
FIG.-13-

METHOD AND APPARATUSES FOR POLICY AND CHARGING CONTROL OF MACHINE-TO-MACHINE TYPE COMMUNICATIONS

PRIORITY

This nonprovisional application is a U.S. National Stage Filing under 35 U.S.C. §371 of International Patent Application Serial No. PCT/EP2012/074954, filed Dec. 10, 2012, and entitled "Method and Apparatuses for Policy and Charging Control of Machine-to-Machine Type Communications" which claims priority to U.S. Provisional Patent Application No. 61/708,678 filed Oct. 2, 2012, and U.S. Provisional Patent Application No. 61/708,759 filed Oct. 26, 2012, all of which are hereby incorporated by reference in their entirety.

TECHNICAL FIELD

The present invention generally relates to Policy and Charging Control procedures for Machine-to-Machine type communications and, more specifically, to the optimization of current Policy and Charging Control procedures in scenarios with a huge amount of Machine-to-Machine devices.

BACKGROUND

The Policy and Charging Control (PCC) architecture and functionality is specified in 3GPP TS 23.203 (v.11.7.0) for Evolved 3GPP Packet Switched domain, including both 3GPP accesses (GERAN/UTRAN/E-UTRAN) and Non-3GPP accesses.

Conventionally, and for the purpose of the present invention, the Policy and Charging Control (PCC) architecture includes a Policy and Charging Enforcement Function (PCEF) in charge of traffic flow detection and enforcement of applicable policies to user traffic flows, a Policy and Charging control Rules Function (PCRF) in charge of providing network control for the traffic flow detection by holding policies and providing PCC rules to the PCEF per user traffic flow basis for enforcement of such policies, and a Subscription Profile Repository (SPR) in charge of providing subscription data for a user to the PCRF.

In particular, the PCEF is a functional entity which may be incorporated, for example, in a Gateway (GW) node providing IP access to the Packet Data Network (PDN), hereinafter the PDN-GW, or in a Gateway GPRS Support Node, hereinafter the GGSN, or which might be provided as a standalone entity.

A so-called Gx reference point is defined in 3GPP TS 29.212 v11.6.0 as the interface between the PCRF and the PCEF, whereas a so-called Sd reference point is defined in 3GPP TS 29.212 v11.6.0 as the interface between the PCRF and the SPR.

In particular, instead of the SPR, the PCC architecture may include a User Data Repository (UDR) communicated with the PCRF via the so-called Ud reference point as disclosed in 3GPP TS 29.212 v11.6.0.

The Gx reference point is used for provisioning, modification and removal of PCC rules from the PCRF to the PCEF and for the notification of traffic plane events from the PCEF to the PCRF. This enables the PCRF to make PCC decisions and have dynamic control over the PCC behaviour at a PCEF, which is the enforcement point.

Regarding the provision of conventional PCC rules, two procedures exist to provide conventional PCC rules by the PCRF: PULL procedure (provisioning solicited by the PCEF) and PUSH procedure (unsolicited provisioning). The PULL procedure typically occurs at default bearer establishment, i.e. during a User Equipment (UE) Attach procedure, when the PCEF initiates establishment of a session with an IP Connectivity Access Network, hereinafter an IP-CAN session, by sending a CC-Request message over the Gx interface. The PUSH procedure occurs in response to information provided to the PCRF via a so-called Rx reference point, also specified by 3GPP, or in response to an internal trigger within the PCRF.

In both cases, the PCC rules provided by the PCRF apply to a particular IP-CAN session, which is associated with a particular UE. The PCEF shall indicate, via the Gx reference point, a request for PCC rules at IP-CAN session establishment, modification and other events. If there is no PCC rule active for a successfully established IP CAN session, the PCEF shall initiate an IP-CAN session termination procedure.

The PCC rule contains, among other elements, one or more service data flow filters, quality of service (QoS) information and charging parameters. The service data flow filters identify the data traffic for which the PCC rule applies, in both uplink and downlink direction, and whether the traffic should be allowed or blocked. The QoS information identifies the performance characteristics of the data flow, which determines the network resources required to transport the service. Finally, the charging parameters include the rating group and other information for credit control and interfacing with online/offline charging systems. With this information, the PCEF can encompass service data flow detection, policy enforcement and flow based charging functionalities.

On the other hand, each UE subject to PCC procedures is provisioned in the SPR. The SPR contains all subscription related information needed for subscription-based policies, and for generation of PCC rules by the PCRF. The SPR can be internal or external, and may be combined with or distributed across other databases in the operator's network. In particular, the SPR may be combined with a Home Subscriber Server (HSS) of the IP-CAN network to form a user database system of the operator's network, or may be provided as an integral part of the aforementioned UDR.

Even though there is a clear consensus in the industry on that mobile Machine-to-Machine (M2M) type communications will play an increasingly prominent role in carrier networks and IT operations, 3GPP TS 23.203 only provides for control of individual devices.

The provision of policy and charging control for millions of M2M type communications (MTC) devices is a challenging task for mobile communications networks. In principle, the MTC devices are expected to be treated as standard mobile subscribers that need to be provisioned and policy-controlled individually. However, applying policy and charging control in scenarios where a huge amount of MTC devices is supported presents a number of drawbacks for the currently existing PCC procedures, such as but not limited to: the amount of data to be stored in subscriber databases and the access rate, the signalling load on the Gx interface, and the processing capabilities of PCRF and PCEF nodes.

For the purpose of the present specification, subscription related information and subscription data, as well as subscriber related information and subscriber data, they all are equivalent terms unless a particular difference or clarification is explicitly cited in a relevant passage. Likewise, the terms 'user', 'UE', 'MTC device', 'device' or even 'subscriber' may indistinctly be used throughout this specification unless a specific different term is unambiguously inferred from the context or explicitly cited in a relevant passage.

On the other hand, 3GPP TS 22.368 states general group based requirements and group based policing in order to optimize procedures on MTC devices. That is, there is a need generally required for introducing and developing the grouping of MTC devices in order to facilitate the handling of MTC devices for network operators.

However, as already commented above, 3GPP TS 23.203 only provides for control of individual MTC devices and, consequently, there is a need to develop and adapt the currently existing PCC procedures in order to support a huge amount of MTC devices.

SUMMARY

The present invention is aimed to at least minimize the above drawbacks and provides for a new method of controlling IP-CAN sessions for a plurality of users of a PCC architecture through a unique session maintained between a PCRF and a PCEF, the method carried out with a user database system, an enhanced PCEF device and an enhanced PCRF server, they all cooperating and adapted to support said method.

Throughout this specification, a PCRF server is a network element arranged for carrying out at least that functionality of a PCRF in accordance with conventional PCC standards as may be necessary for implementing the present invention; a PCEF device is a network element arranged for carrying out at least that functionality of a PCEF in accordance with conventional PCC standards as may be necessary for implementing the present invention; and an SPR is a network element arranged for carrying out at least that functionality of an SPR in accordance with conventional PCC standards as may be necessary for implementing the present invention.

In accordance with a first aspect of the present invention, there is provided a new method of controlling user sessions at an IP Connectivity Access Network, hereinafter IP-CAN sessions, for a plurality of users of a PCC architecture through a unique session maintained between a PCRF and a PCEF.

This method comprises the steps of: provisioning a number of user community profiles at a user database system, wherein each user community profile contains PCC-related information applicable to a plurality of users; associating at the user database system each user community profile with a group identifier that identifies user identifiers of the plurality of users to which the user community profile is applicable; upon establishment of an IP-CAN session from a first user of the plurality of users, a PCEF establishing a session with a PCRF and requesting PCC rules for the IP-CAN session by providing an identifier of the first user; upon request from a PCRF of a user profile for a user identified by the identifier of the first user, the user database system determining the group identifier that identifies the identifier of the first user, and providing the user community profile associated with the group identifier to the PCRF; generating at the PCRF community PCC rules corresponding to the user community profile and submitting the community PCC rules to the PCEF; and at the PCEF, obtaining the group identifier and installing the community PCC rules to be applied for the first user and all subsequent users identified by the group identifier.

This method is advantageously applicable where the users in the plurality of users are MTC devices. And, independently on whether the users are MTC devices or not, the method is advantageous for grouping users of a certain nature, where the method comprises a step of submitting from the PCRF to the PCEF an aggregate maximum bit rate, hereinafter Group-AMBR, for enforcement at the PCEF of the maximum bit rate for the aggregated traffic that the first and subsequent users identified by the group identifier are authorized to use. This Group-AMBR may be included in the user community profile obtained by the PCRF from the user database system or may be sent separately from said user community profile.

An advantageous embodiment is achieved, irrespective of the nature of the users and irrespective of the Group-AMBR, where the method further comprises the steps of: providing from the user database system the group identifier along with the user community profile associated with the group identifier to the PCRF; submitting from the PCRF the group identifier along with the community PCC rules to the PCEF; and associating at the PCEF the group identifier with the community PCC rules. In this case, the PCEF may know a group identifier associated with the community rules to enforce for all the users in the group. This embodiment is even more advantageous, where the group identifier is a regular expression that identifies the user identifiers for the plurality of users by including an indication of a range of users to identify the plurality of users.

That is, where the group identifier is a regular expression the PCEF can easily determine the group to which any subsequent user belongs. Further advantages can thus be obtained upon establishment of a further IP-CAN session from a subsequent user of the plurality of users, the subsequent user identified by an identifier of the subsequent user, where the method also comprises the steps of: determining at the PCEF the regular expression that identifies the identifier of the subsequent user; and applying the corresponding community PCC rules associated with the regular expression for the further IP-CAN session. Particularly advantageous in this embodiment is the case where the method further comprises a step of obtaining in at least one of the PCRF and the PCEF an association between the regular expression that identifies the user identifiers for the plurality of users and one or more service data flow filters that identify data traffic for the plurality of users. And even more advantageous wherein the one or more service data flow filters that identify the data traffic for the plurality of users include an IP subnet in the form of <IP address/mask> in order to identify all incoming traffic from said IP subnet. These later advantages derive from the fact of having associated the group identifier with filters usable to detect data traffic for users in the group.

On the other hand, complementary or alternatively to the above optional embodiments, the method may be enhanced by providing the group identifier towards certain IP-CAN nodes so that additional advantages on network performance can be later obtained. To this end, upon location updating from an IP-CAN node for the first or any subsequent user of the plurality of users, the method may further comprise the steps of: the user database system providing the group identifier to the IP-CAN node; the IP-CAN node triggering the establishment of an IP-CAN session, which includes the group identifier, towards the PCEF; and applying at the PCEF the corresponding community PCC rules associated with the group identifier for the IP-CAN session. In particular, the IP-CAN node triggering the establishment of the IP-CAN session may be one of: a Mobility Management Entity, hereinafter MME, and a Serving GPRS Support Node, hereinafter SGSN. Also in particular, the step of triggering the establishment of the IP-CAN session may include a step of submitting a request for establishment of the IP-CAN session to one of: a Packet Data Network Gateway, hereinafter PDN-GW, and a Gateway GPRS Support Node, hereinafter GGSN, the request including the group identifier, in its way to the PCEF. Moreover, optionally, this method may also comprise a step of submitting from the user database system to the IP-CAN node, along with the group identifier, the Group-AMBR for enforcement at the PCEF of the maximum bit rate for the aggregated traffic that the first and subsequent users identified by the group identifier are authorized to use, so that the request for establishment of the IP-CAN session submitted to the PDN-GW or GGSN may also include this Group-AMBR.

Where the group identifier has been submitted to the IP-CAN node, and the establishment of the IP-CAN session towards the PCEF includes the group identifier, the PCEF may request PCC rules to the PCRF, which in turn requests the user profile for the user with this group identifier as identifier of the user.

Generally speaking for this method, the user database system may include at least portions of a Home Subscriber Server of the IP-CAN and at least portions of a Subscription Profile Repository of the PCC architecture, or may include at least one of: the Home Subscriber Server and the Subscription Profile Repository.

In accordance with a second aspect of the present invention, there is provided a user database system with subscription and subscriber data for users of an IP-CAN and of a PCC architecture.

This user database system comprises: a storage arranged for storing a number of user community profiles, each user community profile including PCC-related information applicable to a plurality of users, and wherein each user community profile is associated with a group identifier that identifies user identifiers of the plurality of users to which the user community profile is applicable; a receiver arranged for receiving a request of a user profile for a user from a PCRF server of the PCC architecture, the request including a user identifier; a processing unit arranged for determining the group identifier that identifies the user identifier and for determining the user community profile associated with the group identifier; and a sender arranged for submitting an answer to the PCRF server with the user community profile.

Aligned with the above method, in accordance with an embodiment of the invention, this user community profile may include an aggregate maximum bit rate, hereinafter Group-AMBR, for enforcement at a PCEF device of the maximum bit rate for the aggregated traffic that the first and subsequent users identified by the group identifier are authorized to use. Alternatively, the Group-AMBR may be submitted to the PCRF server outside the user community profile. The sender of this user database system may thus be arranged for submitting the Group-AMBR included in the user community profile or outside as a separate data.

Likewise and irrespective of whether the Group-AMBR is submitted or not, the sender of this user database system may be arranged for submitting the answer to the PCRF server with the group identifier. This group identifier may be sent along with the user community profile or included in the user community profile.

In an embodiment of the invention, as commented above for the method, the group identifier may be a regular expression that identifies the user identifiers for the plurality of users by including an indication of a range of users to identify the plurality of users.

Complementary or alternatively to the optional embodiments commented in respect of the submission of the Group-AMBR and the group identifier to the PCRF server, and of whether the group identifier is or not the regular expression, this user database system may further comprise an interfacing unit arranged for receiving from an IP-CAN node a location updating for a user identified by a user identifier, and for providing the group identifier that identifies the user identifier to the IP-CAN node.

In accordance with a third aspect of the present invention, there is provided a PCRF server for policy and charging control of IP-CAN sessions for a plurality of users.

This PCRF server comprises: a first interfacing unit arranged for receiving from a PCEF device a request of PCC rules for an IP-CAN session established by a user identified by a user identifier; a second interfacing unit arranged for submitting to a user database system a request of a user profile for the user identified by the user identifier, and for receiving from the user database system a user community profile including PCC-related information applicable to a plurality of users; a rules generator arranged for generating community PCC rules corresponding to the user community profile; and wherein the first interfacing unit is arranged for submitting the community PCC rules to the PCEF device to be enforced therein for the plurality of users.

Aligned with embodiments commented above in respect of the first and second aspects of the invention, the first interfacing unit of the PCRF server may be arranged for submitting to the PCEF device the Group-AMBR for enforcement at the PCEF device of the maximum bit rate for the aggregated traffic that the first and subsequent users identified by the group identifier are authorized to use.

Also aligned with embodiments commented above in respect of the first and second aspects of the invention and irrespective of whether the Group-AMBR is submitted or not, the second interfacing unit of the PCRF server may be arranged for receiving from the user database system a group identifier associated with the user community profile, and wherein the first interfacing unit of the PCRF server may be arranged for submitting the group identifier along with the community PCC rules to the PCEF device. In particular, in accordance with an embodiment of the invention, the group identifier may be a regular expression that identifies the user identifiers for the plurality of users by including an indication of a range of users to identify the plurality of users.

Advantageously, this PCRF server may further comprise a processing unit arranged for generally associating the group identifier that identifies the plurality of users with one or more service data flow filters that identify data traffic for the plurality of users. More particularly, where the group identifier is the regular expression, the processing unit may be arranged for associating the regular expression that identifies the user identifiers for the plurality of users with one or more service data flow filters that identify data traffic for the plurality of users.

In accordance with a fourth aspect of the present invention, there is provided a PCEF device for enforcement of policy and charging control of IP-CAN sessions for a plurality of users.

This PCEF device comprises: a first interfacing arranged for receiving from an IP-CAN node a request of establishment of an IP-CAN session for a first user of the plurality of users; a second interfacing unit arranged for requesting PCC rules for the IP-CAN session to a PCRF server, by providing an identifier of the first user, and for receiving from the PCRF server community PCC rules applicable for the plurality of users; wherein at least one of the first interfacing unit and the second interfacing unit is arranged for obtaining a group identifier identifying the plurality of users for which the community PCC rules are applicable; and an enforcing unit arranged for installing the community PCC rules to be applied for the first user and all subsequent users identified by the group identifier.

Advantageously for the purpose of reducing the exchange of signalling between the PCRF server and the PCEF device, the PCEF device may further comprise a processing unit arranged for associating the group identifier with the community PCC rules.

Aligned with the other aspects of the invention discussed above, this group identifier may be a regular expression that identifies the user identifiers for the plurality of users by including an indication of a range of users to identify the plurality of users. Where this is the case, the processing unit of the PCEF device may be arranged for associating this regular expression with one or more service data flow filters that identify data traffic for the plurality of users.

Moreover, aligned with the method disclosed above and where the group identifier is the regular expression and has been associated with the community PCC rules, the first interfacing unit of the PCEF device may be arranged for receiving from an IP-CAN node a request of establishment of a further IP-CAN session for a subsequent user of the plurality of users, the subsequent user identified by an identifier of the subsequent user; the processing unit of the PCEF device may be arranged for determining the regular expression that identifies the identifier of the subsequent user, and the enforcing unit may be arranged for applying the corresponding community PCC rules associated with the regular expression for the further IP-CAN session.

On the other hand, aligned with the method disclosed above and where the group identifier is received in requests of establishment of a further IP-CAN sessions for subsequent users, The first interfacing unit of the PCEF device may be arranged for receiving from an IP-CAN node a request of establishment of a further IP-CAN session for a subsequent user of the plurality of users, the request including the group identifier that identifies the subsequent user; and the enforcing unit of the PCEF device may be arranged for applying the corresponding community PCC rules associated with the group identifier for the further IP-CAN session.

On the other hand, the invention may be practised by a computer program, in accordance with a fifth aspect of the invention, the computer program being loadable into an internal memory of a computer with input and output units as well as with a processing unit, and comprising executable code adapted to carry out the above method steps. In particular, this executable code may be recorded in a carrier readable in the computer.

BRIEF DESCRIPTION OF THE DRAWINGS

The features, objects and advantages of the invention will become apparent by reading this description in conjunction with the accompanying drawings, in which:

FIG. 1 represents an overview of an exemplary embodiment whereby a unique session between PCRF and PCEF is created upon IP-CAN session establishment by a first MTC device of a community, whereas subsequent IP-CAN session establishments by subsequent MTC devices of the community benefit from data obtained from the unique session between PCRF and PCEF.

FIG. 2 represents an overview of an exemplary network wherein the exemplary embodiment illustrated in FIG. 1 may be applied.

FIG. 3 shows an exemplary sequence of actions carried out by a PCRF server to obtain a user community profile valid for a plurality of PCC users, in accordance with an embodiment.

FIG. 4 illustrates a method of controlling first and subsequent IP-CAN session establishments by respective first and subsequent PCC users by enforcement of community PCC rules at the PCEF device obtained upon establishment of the first IP-CAN session, in accordance with a first embodiment.

FIG. 5 shows a basic configuration of a user database system in accordance with an embodiment.

FIG. 6 shows an exemplary configuration of the user database system in accordance with an embodiment, and complementary to the one illustrated in FIG. 5.

FIG. 7 shows a basic component structure of a user database system in accordance with an embodiment.

FIG. 8a and FIG. 8b illustrate exemplary network scenarios where the present invention may be applied.

FIG. 9 shows a basic component structure of a PCRF server.

FIG. 10 illustrates a method of obtaining by network nodes a group identifier for users belonging to that group and for applying the community PCC rules which correspond to say group upon IP-CAN session establishment by users belonging to that group with or without intervention of the PCC architecture.

FIG. 11 shows an exemplary sequence of actions carried out by a PCRF server to obtain a user community profile valid for a plurality of PCC users, in accordance with another embodiment.

FIG. 12 shows a basic component structure of a user database system in accordance with another embodiment.

FIG. 13 shows a basic component structure of a PCEF device.

DETAILED DESCRIPTION

The following describes currently preferred embodiments of the user database system, the PCEF device and the PCRF server provided for in accordance with the present invention to carry out a method of controlling IP-CAN sessions for a plurality of users of a PCC architecture through a unique session maintained between the PCRF server and the PCEF device.

FIG. 1 illustrates an overview of this method and these entities. In this method, one may assume the SPR 31 has been configured with user community profiles so that a community 4 of users 41 and 42 belong to a same group and share a corresponding user community profile associated with said group identified by a group identifier, for example, as illustrated in FIG. 5 and FIG. 6.

For the purpose of the present invention, a community 4 consists of a group of users 41, 42 with homogeneous characteristics and similar requirements from the point of view of policy and charging control. The user community profile, which applies to a range of users, contains the same information as any individual subscriber profile, i.e. subscription-based policies, PCC rules, etc., and is common to all users that belong to the same community. The difference relies in the field that identifies the subscriber identity, and which may be associated outside the user community profile, pointing to multiple subscriber identifiers, such as IMSI, MSISDN, NAI or any other valid subscriber identifier.

The Table 1 shown below discloses exemplary contents that a user community profile may completely or partially include.

TABLE 1

| ATTRIBUTE | DEFINITION |
|---|---|
| Community_Id | Administrative identifier of the group profile |
| Subscription_MSISDN | User traffic identifier by using a regular expression based on international E.164 format |

TABLE 1-continued

| ATTRIBUTE | DEFINITION |
| --- | --- |
| Subscription_IMSI | User traffic identifier by using a regular expression based on international IMSI format |
| Services_Black_List | List of denied services associated to the group profile |
| List_of_Services | List of available services associated to the group profile. A service has an associated PCC rule |
| PCC_Rule | Policy and Charging Control rule associated to a particular service for the group profile. A PCC rule has an associated QoS profile, charging profile and flow information |
| Flow_Information | Definition of an IP flow packet filter associated to a particular PCC rule in a group profile |
| QoS_Profile | Quality of Service information associated to a particular PCC rule in a group profile |
| Charging_Profile | Charging information associated to a particular PCC rule in a group profile |

In the embodiment illustrated in FIG. 1, a group is identified by a regular expression with wildcard characters (?, *, +) along with one or more subscriber identifiers such as IMSI, MSISDN, or NAI. For example, the regular expression IMSI: 9876543210** identifies both IMSI: 987654321012 and IMSI: 987654321034 as part of the general range IMSI: 987654321000-987654321099.

Aligned with the embodiment illustrated in FIG. 1, the Table 2 shown below discloses exemplary values that a user community profile may define to provide policy and charging control for 100 power meter MTC devices in M2M applications. The MTC devices have SIM cards with IMSI in the range 7160652952503700 to 7160652952503799, and are allocated an IP address within the subnet 192.163.12.0/24; whereas the server that collects the power measurements has the IP address 10.95.130.51.

TABLE 2

```
Community_Id := 1
Subscription_IMSI := 71606529525037**
List_of_Services := Power_Meter
PCC_Rule :=
    Flow_information :=    permit in ip from 192.163.12.0/24 to
                           10.95.130.51
                           permit out ip from 10.95.130.51 to
                           192.163.12.0/24
    QoS_Profile :=
        QoS-Class-Identifier := 9
        Max-Requested-Bandwidth-UL := 3
        Max-Requested-Bandwidth-UL := 3
```

As illustrated in FIG. 1, where the UE-1 41 submits a communication message with IMSI: 987654321012 during step S-1, the PCEF device 2 interrogates the PCRF server 1 during step S-2 with such user identifier. More specifically, upon receipt of an IP-CAN session establishment indication at the PCEF device, the latter requests PCC rules for the IP-CAN session from the PCRF through the Gx reference point commented above. The PCRF server 1 internally fetches a user profile for the user identifier either in local resources or from a user database system, which may be the SPR 31, during a step I-2. The SPR 31 determines that IMSI: 987654321012 belongs to the group, namely range, identified by the regular expression IMSI: 9876543210, and provides back the group identifier, namely the regular expression, along with a user community profile to the PCRF server 1**.

The PCRF server 1 takes proper actions not illustrated in this FIG. 1 but further explained with reference to other embodiments, such as generating PCC rules in accordance with the user community profile, the so-called community PCC rules, and submitting them to the PCEF device 2. In this particular embodiment, the PCRF server 1 explicitly submits to the PCEF device 2 the group identifier, which in this embodiment is the regular expression identifying the range of user identifiers IMSI: 9876543210. As further described with reference to other embodiments, the PCEF device 2 enforces the received community PCC rules for current and subsequent user identifiers belonging to the group identified by the received group identifier, namely those in the range of the regular expression. Then, the communication message with IMSI: 987654321012 is submitted towards its destination 5 during step S-3**.

Some extensions are required on the existing Gx interface to handle the features provided for throughout the present specification.

According to current 3GPP TS 29.212, the Subscription-Id AVP is used to identify the end user's subscription. This is a reused AVP from IETF RFC 4006 that includes a Subscription-Id-Data AVP that holds the identifier and a Subscription-Id-Type AVP that defines the identifier type. The Subscription-Id-Type AVP is of type Enumerated. The current specification defines the following subscription identifiers: END_USER_E164 (0), END_USER_IMSI (1), END_USER_SIP_URI (2), END_USER_NAI (3), END_USER_PRIVATE (4). In accordance with an embodiment of the present invention anyone of the following subscription identifiers, or both, may be added: END_USER_E164_REGx (5), which corresponds to a regular expression based on international E.164 format (e.g., MSISDN); and END_USER_IMSI_REGx (6), which corresponds to a regular expression based on international IMSI format.

According to current 3GPP TS 29.212, the Subscription-Id AVP is only present in the Gx message CC-Request (CCR) Command. In accordance with an embodiment of the invention this Subscription-Id AVP in the CCR command may be amended to include the new subscription identifiers: END_USER_E164_REGx (5) and END_USER_IMSI_REGx (6).

Moreover, complementary or alternatively to the amendment of the conventional CCR command and also in accordance with embodiments of the invention, the Subscription-Id AVP may also be included into the Gx messages: CC-Answer (CCA) Command and Re-Auth-Request (RAR) Command. Furthermore, the Subscription-Id AVP may be included as an optional element and according to the previous definition with the aforementioned new subscription identifiers: END_USER_E164_REGx (5) and END_USER_IMSI_REGx (6).

Upon receipt at the PCEF device 2 a further communication message with IMSI: 987654321034 during step S-4, the PCEF device 2 may determine that this user identifier belongs to the known group represented by the range of user identifiers IMSI: 9876543210, applies the previously received community PCC rules corresponding to said group and routes the further communication message with IMSI: 987654321034 towards its destination 5**.

This embodiment illustrated in FIG. 1, as others further commented, may take place in a network like the one illustrated in FIG. 2, wherein a number of users in the community 4 may be connected with a GGSN 20 through a first Serving GPRS Support Node (SGSN) 7 whereas other users in the community 4 may be connected with the GGSN 20 through a second Serving GPRS Support Node (SGSN) 8. The GGSN 20 in this embodiment may include the PCEF device 2 or, at least, a corresponding functionality enough to carry out the actions commented above with reference to FIG. 1. Such GGSN 20 would then submit the communication messages received from users of the community 4 towards the destination 5, which is a generalization of all particular destinations that each user in the community might communicate with.

In particular, these users in the community 4 may be MTC devices communicating with a unique MTC server 5 or with more than one MTC entity 5.

The network overview shown in FIG. 2 is basically summarized in FIG. 8a, which represents a user 41 with IP connectivity provided by a GPRS IP-CAN 71 and thus connected with the GGSN 20 that incorporates the PCEF device 2. Likewise, FIG. 8b represents a user 41 with IP connectivity provided by a 3GPP IP-CAN GTP-based 72 and thus connected with a PDN-GW 21 that incorporates the PCEF device 2.

These similar scenarios represented in FIGS. 8a and 8b lead to interpret the exemplary network shown in FIG. 2 as also fitting the one in FIG. 8b, where the SGSN 7, 8 and the GGSN 20 in FIG. 2 are respectively replaced by a Mobility Management Entity (MME) 9 and a PDN-GW 21.

As already commented above with reference to FIG. 1, and not illustrated therein, upon receipt of a request for PCC rules from the PCEF device 2, the PCRF server 1 may fetch a user profile for the user from the SPR 31. Generally speaking, the PCRF server 1 may fetch the user profile from a user database system 3, which in particular may be the SPR 31.

FIG. 3 illustrates an exemplary embodiment wherein, during a step S-10, the PCRF server 1 requests a user profile for a user identified by a subscriber identifier from the SPR 31. The SPR 31 searches during a step S-12 for a user community profile for the user identified by the subscriber identifier and, if found, the SPR 31 returns a profile response during a step S-14 to the PCRF server 1 with the user community profile and a group identifier identifying the group associated with the user community profile. Otherwise, where a user community profile is not found for the user identified by the subscriber identifier, the SPR 31 proceeds in the conventional manner of searching during a step S-16 for an individual subscriber profile for the user identified by the subscriber identifier and returning during a step S-18 the profile response with the individual subscriber profile.

As already commented above in respect of the embodiment shown in FIG. 1, the sequence of actions carried out in the embodiment illustrated in FIG. 3 is also preceded by an embodiment of configuring the SPR 31 with user community profiles and respectively associated group identifiers, each group identifier being associated with, or identifying, those subscriber identifiers identifying the users that belong to each group and share the corresponding user community profile.

Since the SPR may be combined with a HSS of the IP-CAN network to form a user database system of the operator's network, or may be provided as an integral part of the aforementioned UDR, as commented above, this embodiment of configuring the SPR 31 may well be generalized as an embodiment of configuring the user database system 3 for correlating each user community profile with a group identifier that identifies those users that belong to each group and share the said user community profile.

As illustrated in FIG. 5 and FIG. 6, the user database system 3 may be provisioned during a step S-03 with user community profiles 60, wherein each user community profile 6j contains PCC-related information applicable to a plurality of users; then, at the user database system 3, each user community profile may be associated during a step S-05 with a group identifier, and each group identifier may be associated during step S-07 with subscriber identifiers of the plurality of users to which the user community profile is applicable.

With these exemplary relationships, the user database system may determine the group identifier that identifies the subscriber identifier and then find the user community profile associated with the group identifier.

Once these exemplary embodiments of configuring the user database system and of obtaining the user community profile by the PCRF server have been commented above, the specific embodiment illustrated in FIG. 1 can be generalized and explained in more detail with reference to FIG. 4.

FIG. 4 thus illustrates an embodiment of the method of controlling first and subsequent IP-CAN session establishments by respective first and subsequent PCC users by enforcement of community PCC rules at the PCEF device, wherein the community PCC rules are generated from the user community profile upon establishment of the first IP-CAN session.

The sequence of actions of this embodiment illustrated in FIG. 4 starts upon receiving at the PCEF device 2 during a step S-100 indication of an IP-CAN session establishment from a first user. Responsive to this indication, the PCEF device 2 initiates a session with the PCRF server 1 by requesting PCC rules during a step S-105 for the IP-CAN session from the PCRF server 1, the request providing an identifier of this first user.

The PCRF server 1 accesses during a step S-110 the user community profile applicable for the identifier of the first user. This access to the user community profile may be carried out in accordance with the embodiment explained above with reference to FIG. 3 or, alternatively, in accordance with another embodiment not illustrated in any drawing whereby the PCRF server 1 either has been internally configured as shown for the user database system 3 in FIG. 5 and FIG. 6, or has previously received all the user community profiles and associated data from the user database system 3.

Once the PCRF server has got the group identifier and the user community profile applicable for the identifier of the first user, the PCRF server 1 makes a policy decision and generates community PCC rules corresponding to the user community profile during a step S-115, and submits back to the PCEF device 2 said community PCC rules during a step S-120.

In a sub-embodiment, as illustrated in this FIG. 4, the PCRF server 1 also includes the group identifier along with the community PCC rules. This is especially advantageous where the group identifier is a regular expression that identifies the user identifiers for the plurality of users in the group by including an indication of a range of users to identify the plurality of users. In particular, the regular expression may present different formats wherein there might also be included at least one user identifier along with the indication of the range of users. Apart from the case where the group identifier is the regular expression, the submission of the group identifier to the PCEF device 2 is also advantageous where the indication of an IP-CAN session establishment from a subsequent user received at the PCEF device 2 includes the group identifier so that the PCEF device 2 can unambiguously derive the applicable community PCC rules to enforce without needs for requesting PCC rules from the PCRF server 1, as further discussed for another embodiment explained with reference to FIG. 10.

Moreover, also applicable to the embodiment illustrated in FIG. 4 and not explicitly depicted therein, the PCRF server 1 may extract from the user community profile, or may receive from the user database system along with said user community profile, or may be provisioned with a so-called aggregate maximum bit rate (Group-AMBR) defined for the whole group and to be used for enforcement at the PCEF device of the maximum bit rate for the aggregated traffic that the first and subsequent users identified by the group identifier are authorized to use. Such Group-AMBR may thus be submitted, if available, to the PCEF device 2 during the step S-120 along with the community PCC rules and with or without the group identifier.

Upon receipt of the community PCC rules by the PCEF device 2 during the step S-120, the PCEF device proceeds to install the received community PCC rules during a step S-125 and, if the group identifier was received along with the community PCC rules, the PCEF device 2 associates during a step S-130 said group identifier and said community PCC rules.

Then, once the community PCC rules have been installed, the PCEF device starts the policy enforcement with said community PCC rules during a step S-135 for the IP-CAN session established by the first user and provides a session establishment response during a step S-140. This policy enforcement with the community PCC rules during the step S-135 may take into consideration, if available, the Group-AMBR in order to enforce at the PCEF device the maximum bit rate for the aggregated traffic that the first and subsequent users identified by the group identifier are authorized to use.

To this end, in accordance with embodiments of the invention, there is provided for a user database system 3 as illustrated in FIG. 7, which generally comprises subscription and subscriber data for users of the IP-CAN and of the PCC architecture, and also comprises a memory or storage 310 arranged for storing a number of user community profiles 61, 62, 63, ..., 6j, ...; each user community profile 6j including PCC-related information applicable to a plurality of users, and wherein each user community profile is associated with a group identifier that identifies user identifiers of the plurality of users to which the user community profile is applicable. The user database system also comprises: a receiver 350 arranged for receiving a request of a user profile for a user from a PCRF server 1, wherein the user is identified in the request by a user identifier; a processing unit 320 arranged for determining the group identifier that identifies the user identifier and for determining the user community profile associated with the group identifier; and a sender 340 arranged for submitting an answer to the PCRF server 1 with the user community profile. In particular, both sender and receiver may be implemented as an interfacing unit 330 arranged for receptions and submissions from and to the PCRF server 1. Also in particular, where the group identifier is a regular expression that identifies the user identifiers for the plurality of users by including an indication of a range of users to identify the plurality of users, this memory or storage 310 is adapted for associating the range of user identifiers with data related to the community PCC rules and with the Group-AMBR, if available.

Where the Group-AMBR is submitted from the user database system, the sender 340 may be arranged for submitting the Group-AMBR included in the user community profile or separately. Likewise, where the group identifier is submitted from the user database system, the sender 340 may be arranged for submitting the group identifier included in the user community profile or separately. Moreover, both group identifier and Group-AMBR may be included in the user community profile or may be submitted separately from the user community profile to the PCRF server 1.

There is provided for, to this end and in accordance with embodiments of the invention, a PCRF server 1 as illustrated in FIG. 9 for policy and charging control of IP-CAN sessions for a plurality of users. This PCRF server comprises: a first interfacing unit 120 arranged for receiving from a PCEF device 2 a request of PCC rules for an IP-CAN session established by a user identified by a user identifier; a second interfacing unit 130 arranged for submitting to a user database system 3, or SPR 31, a request of a user profile for the user identified by the user identifier, and for receiving from the user database system 3, or SPR 31, a user community profile including PCC-related information applicable to a plurality of users; a rules generator 140 arranged for generating community PCC rules corresponding to the user community profile; and wherein the first interfacing unit 120 is arranged for submitting the community PCC rules to the PCEF device to be enforced therein for the plurality of users. In particular, the first interfacing unit 120, the second interfacing unit 130, or both may comprise a sender and a receiver, as described in respect of the user database system 3 above, to respectively deal with submissions and receptions of communication messages.

Also in particular, the second interfacing unit 130 of the PCRF server 1 may be arranged for receiving from the user database system the group identifier associated with the user community profile, either included in the user community profile or separately thereof. Where this is the case, the first interfacing unit 120 may be arranged for submitting the group identifier along with the community PCC rules to the PCEF device 2. Likewise, the second interfacing unit 130 of the PCRF server 1 may be arranged for receiving from the user database system the Group-AMBR, either included in the user community profile or separately thereof. Where this is the case, the first interfacing unit 120 may be arranged for submitting the Group-AMBR to the PCEF device for enforcement therein.

Moreover, where the group identifier is received from the user database system, the PCRF server 1 may comprise a processing unit 150 arranged for associating the group identifier with the community PCC rules and user community profile. Data related to this association, as well as the Group-AMBR if available, may be stored in a memory or storage 110 of the PCRF server 1. In particular, where the group identifier is a regular expression that identifies the user identifiers for the plurality of users by including an indication of a range of users to identify the plurality of users, this memory or storage 110 is adapted for associating the range of user identifiers with data related to the community PCC rules and with the Group-AMBR, if available.

Also to this end and in accordance with embodiments of the invention, there is provided for a PCEF device 2 for enforcement of policy and charging control on IP-CAN sessions for a plurality of users. This PCEF device, as FIG. 13 illustrates, comprises: a first interfacing unit 220 arranged for receiving from an IP-CAN node 7, 8, 9 a request of establishment of an IP-CAN session for a first user, and for subsequent users, if any, of the plurality of users; a second interfacing unit 230 arranged for requesting PCC rules for the IP-CAN session, by providing an identifier of the first user, to a PCRF server 1, and for receiving from the PCRF server 1 community PCC rules applicable for the plurality of users; wherein at least one of the first interfacing unit 220 and the second interfacing unit 230 may be arranged for obtaining a group identifier identifying the plurality of users for which the community PCC rules are applicable; and an enforcing unit 240 arranged for installing the community PCC rules to be applied for the first user and all subsequent users identified by the group identifier.

In particular, where the group identifier was received during the step S-120 along with the community PCC rules at the PCEF device 2, at least the second interfacing unit 230 is arranged for obtaining the group identifier identifying the plurality of users, and the PCEF device 2 also comprises a processing unit 250 arranged for associating the group identifier with the community PCC rules during the above step S-130.

Moreover, the second interfacing means 230 of the PCEF device 2 may be arranged for receiving, if submitted, the Group-AMBR from the PCRF server 1; and the processing unit 250 of the PCEF device 2 may then be arranged for enforcement at the PCEF device 2 of the maximum bit rate for the aggregated traffic that the first and subsequent users identified by the group identifier are authorized to use.

Data related to the association of the group identifier with the community PCC rules, as well as the Group-AMBR if available, may be stored in a memory or storage 210 of the PCEF device 2. In particular, where the group identifier is a regular expression that identifies the user identifiers for the plurality of users by including an indication of a range of users to identify the plurality of users, this memory or storage 210 is adapted for associating the range of user identifiers with data related to the community PCC rules and with the Group-AMBR, if available.

Back to the sequence of actions illustrated in FIG. 4, upon receiving at the PCEF device 2 a further indication of an IP-CAN session establishment from a subsequent user during a step S-145, the PCEF device 2 determines during a step S-150 the community PCC rules to be applied for the identifier of the subsequent user received with the further indication of the IP-CAN session establishment.

Different sub-embodiments are discussed in the following to carry out the step S-150 of determining the applicable community PCC rules, and which are aligned with the different options discussed above regarding the submission of the group identifier.

In a first alternative, where the group identifier was submitted during the step S-120 from the PCRF server 1 and was associated during the step S-130 with the community PCC rules by the PCEF device 2, a first sub-embodiment turns up where the group identifier is the regular expression that identifies the user identifiers for the plurality of users in the group. In this first sub-embodiment, the determination made by the PCEF device during the step S-150 is carried out by determining the regular expression that identifies the identifier of the subsequent user and by applying during a step S-155 the corresponding community PCC rules associated with the regular expression. To this end and as illustrated in FIG. 13, the first interfacing unit 220 of the PCEF device 2 may be arranged for receiving from an IP-CAN node, which for example may be a SGSN 8 or an MME 9, a request of establishment of a further IP-CAN session for a subsequent user of the plurality of users, the subsequent user identified by an identifier of the subsequent user; the processing unit 250 of the PCEF device 2 may be arranged for determining the regular expression that identifies the identifier of the subsequent user; and the enforcing unit 240 of the PCEF device 2 may be arranged for applying the corresponding community PCC rules associated with the regular expression for the further IP-CAN session.

In addition, under this first sub-embodiment of the first alternative, the method may further comprise a step not illustrated in any drawing of obtaining in at least one of the PCRF server and the PCEF device an association between the regular expression that identifies the user identifiers for the plurality of users and one or more service data flow filters that identify data traffic for the plurality of users. In particular, the one or more service data flow filters that identify the data traffic for the plurality of users may include an IP subnet in the form of <IP address/mask> in order to identify all incoming traffic from said IP subnet. To this end, a processing unit 150 of the PCRF server 1 shown in FIG. 7 may be arranged for associating the regular expression that identifies the user identifiers for the plurality of users with one or more service data flow filters that identify data traffic for the plurality of users. Likewise, a processing unit 250 of the PCEF device 2 shown in FIG. 13 may be arranged for associating the regular expression that identifies the user identifiers for the plurality of users with one or more service data flow filters that identify data traffic for the plurality of users.

A second sub-embodiment turns up in this first alternative where the group identifier does not correspond to any the regular expression identifying the user identifiers for the plurality of users in the group. In this second sub-embodiment, the further indication of the IP-CAN session establishment from the subsequent user may also include the group identifier, as commented above and further discussed in detail for another embodiment explained with reference to FIG. 10, so that the determination made by the PCEF device during the step S-150 is carried out by matching the group identifier received in the further indication of the IP-CAN session establishment from the subsequent user with the group identifier associated at the PCEF device with the community PCC rules, and enforcing during the step S-155 said community PCC rules.

In a second alternative, where the group identifier was not submitted during the step S-120 from the PCRF server 1 and was not associated during the step S-130 with the community PCC rules by the PCEF device 2, a first sub-embodiment turns up where the further indication of the IP-CAN session establishment from the subsequent user includes the group identifier, as illustrated in step S-315 of FIG. 10 and further commented. In this first sub-embodiment of the second alternative, the PCEF device 2 requests PCC rules to the PCRF server 1, as part of the determination step S-150, identifying the subsequent user by the group identifier. Since the PCRF server 1 knows the community PCC rules associated with said group identifier, it returns such community PCC rules to the PCEF device 2, and the latter can determine that such community PCC rules were already installed and can also be enforced during the step S-155 for the further indication of the IP-CAN session establishment from the subsequent user. A second sub-embodiment turns up for this second alternative where the group identifier is not received in the further indication of the IP-CAN session establishment from the subsequent user, which just includes the identifier of the subsequent user. In this second sub-embodiment not fully illustrated in any drawing, the group identifier is the regular expression identifying the user identifiers for the plurality of users in the group, and this group identifier is kept in the PCRF server and not provided to the PCEF device. In this situation, the PCEF device requests PCC rules to the PCRF server 1, as part of the determination step S-150, providing the identifier of the subsequent user. The PCRF server can then determine the applicable community PCC rules by matching the received identifier of the subsequent user with the regular expression, and can submit such community PCC rules to the PCEF device. The PCEF device can determine that such community PCC rules were already installed and can also be enforced during the step S-155 for the further indication of the IP-CAN session establishment from the subsequent user.

Once the PCEF device 2 has enforced the community PCC rules for the further IP-CAN session establishment of the subsequent user, the PCEF device returns a session establishment response during a step S-160, as illustrated in FIG. 4.

Some sub-embodiments have been commented above for different options or alternatives of the general method and with reference to the embodiment illustrated in FIG. 10. This embodiment in FIG. 10 just takes into consideration the particular actions proposed in this instant specification to be introduced in currently conventional mechanisms in order to further enhance the above method, especially for huge amount of MTC devices.

A conventional mechanism enhanced by the present invention is the attach procedure of a UE with an IP-CAN as described, for instance, in 3GPP TS 23.401. During the Attach procedure, an IP-CAN node such as an MME 9 or SGSN 8 may obtain the group identifier, along with subscription data from a HSS 32 of the IP-CAN.

For example, as illustrated in FIG. 10, such IP-CAN node 8, 9 may submit an Update Location request for a user identified by a user identifier to the HSS 32 of the IP-CAN during a step S-305. In particular, this HSS 32 may be an integral part of a user database system 3 or may cooperate with the SPR 31 of the PCC architecture in order to correlate each respective data in respect of groups of users, such as a plurality of MTC devices may be. The HSS 32, or the user database system 3, returns in a step S-310 an Update Location response which includes the group identifier identifying the group which the user identified by the user identifier belongs to.

To this end, the HSS 32 or the user database system 3 may further comprise an interfacing unit 360 arranged for receiving from the IP-CAN node 8, 9 a location updating for a user identified by a user identifier, and for providing the group identifier that identifies the user identifier to the IP-CAN node.

FIG. 12 illustrates an alternative structure to the one commented above with reference to FIG. 7. The user database system 3 illustrated in FIG. 12 includes separate and cooperating entities, namely the HSS 32 and the SPR 31. In this user database system 3 shown in FIG. 12, the HSS 32 includes the interfacing unit 360 whereas the SPR 31 includes the sender 340 and the receiver 350, as also shown in FIG. 7. Where the HSS 32 and SPR 31 are provided as compacted entities of the user database system 3, the common processing unit 320 and storage 310 illustrated in FIG. 7 may be replaced by dedicated processing units 3202-3201 and storages 3102-3101 respectively allocated to the HSS 32 and SPR 31 as illustrated in FIG. 12. As for the general structure of FIG. 7, the sender 340 and receiver 350 shown in FIG. 12 may also be implemented as an interfacing unit 330 arranged for receptions and submissions from and to the PCRF server 1.

Back to the sequence of actions illustrated in FIG. 10, the IP-CAN node 8, 9 may then trigger the establishment of an IP-CAN session during a step S-315 and providing the group identifier. This trigger, or rather the IP-CAN session establishment request, may pass through different network entities, such as a serving GW, depending on the particular type of IP-CAN until reaching a PCEF device 2. For example, where the IP-CAN is a GPRS IP-CAN 71, the IP-CAN session establishment request would arrive at the PCEF device 2 located in the GGSN 20, as illustrated in FIG. 8a; whereas the IP-CAN session establishment request would arrive at the PCEF device 2 located in the PDN-GW 21, where the IP-CAN is a 3GPP IP-CAN GTP-based 72.

As anticipated above when discussing different alternatives, options and sub-embodiments with reference to the general method illustrated in FIG. 4, the PCEF device 2 receiving the IP-CAN session establishment request during the step S-315 may act differently depending on whether or not the PCEF device had previously received the group identifier from the PCRF server 1 and associated it with the community PCC rules.

Where the PCEF device 2 has already associated the group identifier received from the PCRF server with the corresponding community PCC rules, the PCEF device may determine the applicable community PCC rules during a step S-380 by matching the group identifier received in the IP-CAN session establishment request with the group identifier received from the PCRF server 1 and associated with such community PCC rules. Then, the PCEF device may apply such community PCC rules during a step S-385, and returns the IP-CAN session establishment response during a step S-390. To this end and with reference to FIG. 13, the first interfacing unit 220 of the PCEF device 2 may be arranged for receiving from the IP-CAN node 8, 9 a request of establishment of a further IP-CAN session for a subsequent user of the plurality of users, wherein the request includes the group identifier that identifies the subsequent user; and the enforcing unit 240 of the PCEF device 2 may be arranged for applying the corresponding community PCC rules associated with the group identifier for the further IP-CAN session.

Where the PCEF device 2 had not received the group identifier from the PCRF server, as commented above for the first sub-embodiment of the second alternative, the PCEF device 2 requests PCC rules to the PCRF server 1, identifying the user by the group identifier, during a sequence of steps S-300. Since the PCRF server 1 knows the community PCC rules associated with said group identifier, it returns such community PCC rules to the PCEF device 2, and the latter can determine during the step S-380 that such community PCC rules were already installed and can be enforced during the step S-385, and then the PCEF device 2 returns the IP-CAN session establishment response during a step S-390.

Also in this embodiment illustrated in FIG. 10, complementary or alternatively to the submission of the Group-AMBR from the PCRF server 1 to the PCEF device 2, the HSS 32 or the user database 3 may optionally submit to the IP-CAN node, along with the group identifier during the step S-310, said Group-AMBR defined for the whole group and to be used for enforcement at the PCEF device of the maximum bit rate for the aggregated traffic that the first and subsequent users identified by the group identifier are authorized to use. The IP-CAN node 8, 9 may further include, if available, such Group-AMBR in the IP-CAN session establishment request submitted during the step S-315, likely through other IP-CAN entities, to the PCEF device 2 along with the group identifier.

Regarding the sequence of steps S-300 referred to in FIG. 10, and which may or not take place depending on factors commented above, the FIG. 11 illustrates some embodiments of how the general method may be carried out where the group identifier was not submitted from the PCRF server to the PCEF device but it was submitted from the user database system 3, or the HSS 32, to the IP-CAN node 8, 9.

As FIG. 11 illustrates, the PCEF device 2 may receive during a step S-320 an IP-CAN session establishment request which was submitted through the IP-CAN (see for example the step S-315 in FIG. 10). Upon receipt of such request, which includes the group identifier, the PCEF device determines that such group identifier is unknown therein and submits an indication of the IP-CAN session establishment request to the PCRF server 1 during a step S-325.

Where the group identifier is unknown to the PCRF server, that is, it had not previously been received from the user database system 3 or SPR 31, the PCRF server request a profile for the group identifier to the user database system 3 or SPR 31 during a step S-330. To this end, the second interfacing unit 130 of the PCRF server illustrated in FIG. 9 is arranged for including the group identifier in the request of a profile for a user. The user database system 3 or SPR 31 fetches a user community profile for the received group identifier and returns it to the PCRF server during a step S-335, likely along with, or including, the optional Group-AMBR value commented above.

Once the user community profile for the group identifier is known to the PCRF server, either previously or recently received, the PCRF server takes a policy decision during the step S-340, decision which may take into consideration the Group-AMBR, if available. This Group-AMBR might be configured at the PCRF server without needs for the optional submission from the user database system 3 or SPR 31. If the PCC architecture includes a Traffic Detection Function (TDF) server 25, the PCRF server may initiate a TDF session with the TDF server during steps S-345 and S-350.

Where the PCRF server has recently received the user community profile in this step S-335, the PCRF server may generate community PCC rules from the user community profile in a similar manner as in the embodiment described above with reference to FIG. 4, and return said community PCC rules along with the group identifier and, optionally, the Group-AMBR to the PCEF device 2 during a step S-335. The PCEF device 2 may eventually return the IP-CAN session establishment response during a step S-360. In case different values are obtained at the PCEF device 2, from either the IP-CAN node or the PCRF server, one of these values might override or take precedence over the other one.

Apart from the advantages explicitly disclosed above in respect of the particular embodiments, other advantages and embodiments are disclosed in the following. The policy solution suggested for groups of MTC devices thus allows the introduction of the Group-AMBR in order to enforce the maximum aggregate bit rate for group members within a common PCEF.

The Group-AMBR may be locally configured in the PCEF on a per group basis, where a PCC deployment is not significantly deployed. In the case of having a relevant PCC deployment, the Group-AMBR provided by the PCRF over Gx overrides any group level setting in the PCEF.

Apart from that, in a PCC architecture with more than one PCEF, a PDN GW or GGSN selection function may optionally utilize the group identifier to select a specific PCEF where the group based policy control is to be enforced.

In this respect, the HSS or user database system may maintain logic such that it provides a PDN GW or GGSN FQDN as PDN GW or GGSN identity at connection establishment of the $1^{st}$ group member, and further provides the allocated PDN GW or GGSN as a static PDN GW or GGSN to the MME or SGSN at subsequent connection requests by other group members.

In the case of a network deployment where multiple PCEFs may be selected the operator may configure an appropriate fraction of the Group-AMBR in the PCEFs. This could also be handled by the PCRF distributing a portion of the Group-AMBR across the PCEFs to which group members have sessions.

On the other hand, all references and teachings throughout this specification related with establishment of an IP-CAN session for a user may directly be applicable to modification of an existing IP-CAN session for a user. Moreover, the acknowledgement of any IP-CAN session modification, as well as the acknowledgement of any IP-CAN session establishment, may include the group identifier, the Group-AMBR, or both.

The invention may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method of controlling user sessions at an IP Connectivity Access Network, hereinafter IP-CAN sessions, for a plurality of users of a Policy and Charging Control, hereinafter PCC, architecture through a unique session maintained between a Policy and Charging control Rules Function, hereinafter PCRF, and a Policy and Charging Enforcement Function, hereinafter PCEF, the method comprising the steps of:

provisioning a number of user community profiles at a user database system, wherein each user community profile contains PCC-related information applicable to a plurality of users;

associating at the user database system each user community profile with a group identifier that identifies user identifiers of the plurality of users to which the user community profile is applicable, the group identifier is a regular expression that identifies the user identifiers for the plurality of users by including an indication of a range of users to identify the plurality of users;

upon establishment of an IP-CAN session from a first user of the plurality of users, a PCEF establishing a session with a PCRF and requesting PCC rules for the IP-CAN session by providing an identifier of the first user;

upon request from a PCRF of a user profile for a user identified by the identifier of the first user, the user database system determining the group identifier that identifies the identifier of the first user, and providing the user community profile associated with the group identifier to the PCRF;

generating at the PCRF community PCC rules corresponding to the user community profile and submitting the community PCC rules to the PCEF;

at the PCEF, obtaining the group identifier and installing the community PCC rules to be applied for the first user and all subsequent users identified by the group identifier;

providing from the user database system the group identifier along with the user community profile associated with the group identifier to the PCRF;

submitting from the PCRF the group identifier along with the community PCC rules to the PCEF; and associating at the PCEF the group identifier with the community PCC rules.

2. The method of claim 1, wherein the plurality of users are Machine-to-Machine type communication, hereinafter MTC, devices.

3. The method of claim 1, further comprising a step of submitting from the PCRF to the PCEF a group aggregate maximum bit rate (Group-AMBR) for enforcement at the PCEF of the maximum bit rate for the aggregated traffic that the first and subsequent users identified by the group identifier are authorized to use.

4. The method of claim 1, wherein upon establishment of a further IP-CAN session from a subsequent user of the plurality of users, the subsequent user identified by an identifier of the subsequent user, the method further comprises the steps of:

determining at the PCEF the regular expression that identifies the identifier of the subsequent user; and applying the corresponding community PCC rules associated with the regular expression for the further IP-CAN session.

5. The method of claim 1, further comprising a step of obtaining in at least one of the PCRF and the PCEF an association between the regular expression that identifies the user identifiers for the plurality of users and one or more service data flow filters that identify data traffic for the plurality of users.

6. The method of claim 5, wherein the one or more service data flow filters that identify the data traffic for the plurality of users include an IP subnet in the form of <IP address/mask> in order to identify all incoming traffic from said IP subnet.

7. The method of claim 1, wherein upon location updating from an IP-CAN node for the first or subsequent user, the method further comprises the steps of:

the user database system providing the group identifier to the IP-CAN node;

the IP-CAN node triggering the establishment of an IP-CAN session, which includes the group identifier, towards the PCEF; and applying at the PCEF the corresponding community PCC rules associated with the group identifier for the IP-CAN session.

8. The method of claim 7, wherein the IP-CAN node triggering the establishment of the IP-CAN session is one of: a Mobility Management Entity, hereinafter MME, and a Serving GPRS Support Node, hereinafter SGSN, and wherein the step of triggering the establishment of the IP-CAN session includes a step of submitting a request for establishment of the IP-CAN session to one of: a Packet Data Network Gateway, hereinafter PDN-GW, and a Gateway GPRS Support Node, hereinafter GGSN, the request including the group identifier, in its way to the PCEF.

9. The method of claim 8, further comprising a step of submitting from the user database system to the IP-CAN node, along with the group identifier, a group aggregate maximum bit rate (Group-AMBR), for enforcement at the PCEF of the maximum bit rate for the aggregated traffic that the first and subsequent users identified by the group identifier are authorized to use, and wherein the request for establishment of the IP-CAN session submitted to the PDN-GW or GGSN includes the Group-AMBR.

10. The method of claim 7, wherein the request from the PCRF of the user profile for the user includes the group identifier as identifier of the user.

11. The method of any claim 1, wherein the user database system includes at least one of a Home Subscriber Server of the IP-CAN and a Subscription Profile Repository of the PCC architecture.

12. A user database system with subscription and subscriber data for users of an IP Connectivity Access Network, hereinafter IP-CAN, and of a Policy and Charging Control, hereinafter PCC, architecture, the user database system comprising:

a storage arranged for storing a number of user community profiles, each user community profile including PCC-related information applicable to a plurality of users, and wherein each user community profile is associated with a group identifier that identifies user identifiers of the plurality of users to which the user community profile is applicable, the group identifier comprising a regular expression that identifies the user identifiers for the plurality of users by including an indication of a range of users to identify the plurality of users;

a receiver arranged for receiving a request of a user profile for a user from a Policy and Charging control Rules Function, hereinafter PCRF, server of the PCC architecture, the request including a user identifier;

a processing unit arranged for determining the group identifier that identifies the user identifier and for determining the user community profile associated with the group identifier; and a sender arranged for submitting an answer to the PCRF server with the user community profile.

13. The user database system of claim 12, wherein the user community profile includes a group aggregate maximum bit rate (Group-AMBR) for enforcement at a Policy and Charging Enforcement Function, hereinafter PCEF, device of the maximum bit rate for the aggregated traffic that the first and subsequent users identified by the group identifier are authorized to use.

14. The user database system of claim 12, wherein the sender is arranged for submitting the answer to the PCRF server with the group identifier along with the user community profile.

15. The user database system of claim 12, further comprising an interfacing unit arranged for receiving from an IP-CAN node a location updating for a user identified by a user identifier, and for providing the group identifier that identifies the user identifier to the IP-CAN node.

16. A Policy and Charging control Rules Function, hereinafter PCRF, server for Policy and Charging Control, hereinafter PCC, of user sessions at an IP Connectivity Access Network, hereinafter IP-CAN, sessions, for a plurality of users, the PCRF server comprising:

a first interfacing unit arranged for receiving from a Policy and Charging Enforcement Function, hereinafter PCEF, device a request of PCC rules for an IP-CAN session established by a user identified by a user identifier;

a second interfacing unit arranged for:

submitting to a user database system a request of a user profile for the user identified by the user identifier, and for receiving from the user database system a user community profile including PCC-related information applicable to a plurality of users; and receiving from the user database system a group identifier associated with the user community profile, and wherein the first interfacing unit is arranged for submitting the group identifier along with the community PCC rules to the PCEF device, the group identifier comprising a regular expression that identifies the user identifiers for the plurality of users by including an indication of a range of users to identify the plurality of users;

a rules generator arranged for generating community PCC rules corresponding to the user community profile; and the first interfacing unit arranged for submitting the community PCC rules to the PCEF device to be enforced therein for the plurality of users.

17. The PCRF server of claim 16, wherein the first interfacing unit is arranged for submitting to the PCEF device a group aggregate maximum bit rate (Group-AMBR) for enforcement at the PCEF device of the maximum bit rate for the aggregated traffic that the first and subsequent users identified by the group identifier are authorized to use.

18. The PCRF server of claim 16, further comprising a processing unit arranged for associating the regular expression that identifies the user identifiers for the plurality of users and one or more service data flow filters that identify data traffic for the plurality of users.

19. A Policy and Charging Enforcement Function, hereinafter PCEF, device for enforcement of Policy and Charging Control, hereinafter PCC, on user sessions at an IP Connectivity Access Network, hereinafter IP-CAN sessions, for a plurality of users, the PCEF device comprising:
- a first interfacing unit arranged for receiving from an IP-CAN node a request of establishment of an IP-CAN session for a first user of the plurality of users;
- a second interfacing unit arranged for requesting PCC rules for the IP-CAN session, by providing an identifier of the first user, to a Policy and Charging control Rules Function, hereinafter PCRF, server, and for receiving from the PCRF server community PCC rules applicable for the plurality of users;
- a processing unit arranged for associating the group identifier with the community PCC rules, the group identifier comprising a regular expression that identifies the user identifiers for the plurality of users by including an indication of a range of users to identify the plurality of users;
- at least one of the first interfacing unit and the second interfacing unit arranged for obtaining a group identifier identifying the plurality of users for which the community PCC rules are applicable; and
- an enforcing unit arranged for installing the community PCC rules to be applied for the first user and all subsequent users identified by the group identifier.

20. The PCEF device of claim 19, wherein the first interfacing unit is arranged for receiving from an IP-CAN node a request of establishment of a further IP-CAN session for a subsequent user of the plurality of users, the subsequent user identified by an identifier of the subsequent user, wherein the processing unit is arranged for determining the regular expression that identifies the identifier of the subsequent user, and wherein the enforcing unit is arranged for applying the corresponding community PCC rules associated with the regular expression for the further IP-CAN session.

21. The PCEF device of claim 19, wherein the first interfacing unit is arranged for receiving from an IP-CAN node a request of establishment of a further IP-CAN session for a subsequent user of the plurality of users, the request including the group identifier that identifies the subsequent user, and wherein the enforcing unit is arranged for applying the corresponding community PCC rules associated with the group identifier for the further IP-CAN session.

22. The PCEF device of claim 19, wherein the processing unit is arranged for associating the regular expression that identifies the user identifiers for the plurality of users and one or more service data flow filters that identify data traffic for the plurality of users.

23. The method of claim 3, wherein the Group-AMBR is included in the user community profile obtained by the PCRF from the user database system.

* * * * *

UNITED STATES PATENT AND TRADEMARK OFFICE
CERTIFICATE OF CORRECTION

PATENT NO. : 9,319,867 B2  Page 1 of 1
APPLICATION NO. : 14/432591
DATED : April 19, 2016
INVENTOR(S) : Rivas Molina et al.

It is certified that error appears in the above-identified patent and that said Letters Patent is hereby corrected as shown below:

Drawings

In Fig. 5, Sheet 5 of 13, delete "6i" and insert -- 6j --, therefor.

Specification

In Column 7, Line 29, delete "users," and insert -- users. --, therefor.

Claims

In Column 21, Line 49, in Claim 11, delete "any claim" and insert -- claim --, therefor.

Signed and Sealed this
Twelfth Day of July, 2016

Michelle K. Lee
*Director of the United States Patent and Trademark Office*